(12) United States Patent
Zhao et al.

(10) Patent No.: US 8,429,654 B2
(45) Date of Patent: Apr. 23, 2013

(54) APPARATUS AND METHOD FOR GUARANTEED BATCH EVENT DELIVERY IN A PROCESS CONTROL SYSTEM

(75) Inventors: Jianhua Zhao, Ringoes, NJ (US); David Granatelli, Lilyfield (AU); Muslim G. Kanji, Allentown, PA (US)

(73) Assignee: Honeywell International Inc., Morristown, NJ (US)

( * ) Notice: Subject to any disclaimer, the term of this patent is extended or adjusted under 35 U.S.C. 154(b) by 1141 days.

(21) Appl. No.: 11/823,207

(22) Filed: Jun. 27, 2007

(65) Prior Publication Data

US 2008/0010641 A1 Jan. 10, 2008

Related U.S. Application Data

(60) Provisional application No. 60/818,763, filed on Jul. 6, 2006.

(51) Int. Cl.
| G06F 9/46 | (2006.01) |
| G05B 15/02 | (2006.01) |
| G05B 19/18 | (2006.01) |
| G05B 11/01 | (2006.01) |

(52) U.S. Cl.
USPC .................................. 718/101; 700/9; 700/21

(58) Field of Classification Search .................... 718/101
See application file for complete search history.

(56) References Cited

U.S. PATENT DOCUMENTS

| 4,807,224 A * | 2/1989 | Naron et al. .................... 370/218 |
| 5,142,663 A * | 8/1992 | Janis et al. ............................. 1/1 |
| 5,555,504 A | 9/1996 | Lepper et al. |
| 6,317,638 B1 | 11/2001 | Schreder et al. |
| 6,560,720 B1 * | 5/2003 | Chirashnya et al. ............. 714/32 |
| 6,732,006 B2 * | 5/2004 | Haanstra et al. ............... 700/121 |
| 6,871,293 B2 * | 3/2005 | Bomfim et al. ..................... 714/4 |
| 7,706,895 B2 * | 4/2010 | Callaghan ........................ 700/17 |
| 2002/0099464 A1 * | 7/2002 | O'Connor et al. ............. 700/117 |
| 2003/0135537 A1 * | 7/2003 | Mikael et al. .................. 709/103 |
| 2007/0156272 A1 * | 7/2007 | Winstead et al. ................ 700/97 |
| 2007/0300120 A1 * | 12/2007 | Kim et al. ....................... 714/749 |

FOREIGN PATENT DOCUMENTS

GB    2285148 A    6/1995

OTHER PUBLICATIONS

Unknown Author, "Guaranteed Messaging with JMS", Jan. 31, 2002, www2.sys-con.com/itsg/virtualcd/java/archives/0604/chappell/index.html.*

Unknown Author, "Synchronous and Asynchronous I/O", May 30, 2008, msdn.microsoft.com/en-us/library/windows/desktop/aa365683.*

(Continued)

*Primary Examiner* — Lewis A Bullock, Jr.
*Assistant Examiner* — Kevin X Lu

(57) ABSTRACT

A controller controls one or more process elements in a process control system. The controller also generates and buffers multiple events associated with operation of the controller. Each event is associated with a unique identifier, such as a numerical identifier. A supervisory device receives at least some of the events from the controller. The supervisory device determines if any of the events have not been received from the controller based on the unique identifiers. The supervisory device also initiates an event recovery if at least one of the events has not been received from the controller. During the event recovery, the controller recovers at least one event, such as any event having a numerical identifier greater than a numerical identifier identified by the supervisory device. The controller communicates the at least one recovered event to the supervisory device during the event recovery.

21 Claims, 11 Drawing Sheets

OTHER PUBLICATIONS

Unknown Author, "WebSphere MQ Synchronous Communication", Dec. 20, 2006, publib.boulder.ibm.com/infocenter/zos/basics/index.jsp?topic=/com.ibm.zos.zmidwebs/zmiddle_116.htm.*

Method for Processing Production Progress Data With Error Correction, IBM Technical Disclosure Bulletin, IBM Corp., New York, US, vol. 38, No. 12, Dec. 1995, pp. 561-563.

Honeywell, "TotalPlant Batch Specification and Technical Data," Release 3.0, Apr. 2002, 59 pages.

Honeywell, "TotalPlant Batch User Guide," Release 8.0, Jul. 2007, 644 pages, see esp. pp. 141-170, 177-204, 211-220, 253-266, 313-368 and 429-442.

Honeywell, "TotalPlant Batch Technical Reference," Release 8.0, Jul. 2007, 508 pages see esp. pp. 227-264, 267-270, 293-298 & 379-402.

Honeywell, "TotalPlant Batch User Guide," Release 2.1, May 2000, 449 pages, see esp. pp. 112-132, 137-153, 157-162, 180-184, 196-235 and 280-290.

Honeywell, "TotalPlant Batch Technical Reference," Release 2.1, May 2000, 435, pages, see esp. pp. 160-187, 192-195, 214-217 & 335-354.

* cited by examiner

FIG. 7

APPARATUS AND METHOD FOR GUARANTEED BATCH EVENT DELIVERY IN A PROCESS CONTROL SYSTEM

CROSS-REFERENCE TO RELATED APPLICATIONS

This application claims priority under 35 U.S.C. §119(e) to U.S. Provisional Patent Application No. 60/818,763 filed on Jul. 6, 2006, which is hereby incorporated by reference.

This application is related to U.S. patent application Ser. No. 11/453,119 filed on Jun. 14, 2006, which is hereby incorporated by reference.

TECHNICAL FIELD

This disclosure relates generally to control systems and more specifically to an apparatus and method for guaranteed batch event delivery in a process control system.

BACKGROUND

Processing facilities are often managed using process control systems. Example processing facilities include chemical, pharmaceutical, paper, and petrochemical production plants. Among other operations, process control systems typically interact with and control industrial equipment in the processing facilities, such as equipment used to produce chemical, pharmaceutical, paper, or petrochemical products. Often times, these or other types of products are manufactured or processed in batches.

Regulated industries often require complete batch records of all aspects related to the manufacture of batch products. In fact, the data records for batch execution are often as important as the products themselves. Non-regulated industries, though not having the same requirements for batch record completeness, also typically use batch records to support functions such as quality assurance analyses. As a result, complete or near-complete batch records are often desirable or required in a process control system.

SUMMARY

This disclosure provides an apparatus and method for guaranteed batch event delivery in a process control system.

In a first embodiment, a method includes generating multiple events associated with operation of a controller in a process control system. The method also includes storing the events in a buffer and communicating the events to a supervisory device associated with the controller. The method further includes receiving a request to recover one or more of the events. In addition, the method includes recovering at least one of the events from the buffer and communicating the at least one recovered event to the supervisory device.

In particular embodiments, each event is associated with a unique identifier, and the request identifies the unique identifier associated with one of the events.

In other particular embodiments, the unique identifier identified in the request includes a numerical identifier. Also, recovering the at least one event from the buffer includes recovering any event associated with a numerical identifier that is greater than the numerical identifier identified in the request.

In still other particular embodiments, the method further includes generating an alarm in response to recovering less than all desired events from the buffer.

In a second embodiment, an apparatus includes at least one memory configured to store a unique identifier associated with a first event received from a controller in a process control system. The apparatus also includes at least one processor configure to receive a second event from the controller and to determine whether any events between the first event and the second event have not been received from the controller using the unique identifier. The at least one processor is also configure to initiate an event recovery if at least one event between the first event and the second event has not been received from the controller.

In a third embodiment, a computer program is embodied on a computer readable medium. The computer program includes computer readable program code for generating multiple events associated with operation of a controller in a process control system. The computer program also includes computer readable program code for storing the events in a buffer and computer readable program code for communicating the events to a supervisory device associated with the controller. The computer program further includes computer readable program code for receiving a request to recover one or more events. In addition, the computer program includes computer readable program code for recovering at least one of the events from the buffer and computer readable program code for communicating the at least one recovered event to the supervisory device.

In a fourth embodiment, a system includes a controller configured to control one or more process elements in a process control system. The controller is also configured to generate and buffer multiple events associated with operation of the controller. Each event is associated with a unique identifier. The system also includes a supervisory device configured to receive at least some of the events from the controller and to determine if any of the events have not been received from the controller based on the unique identifiers. The supervisory device is also configured to initiate an event recovery by the controller if at least one of the events has not been received from the controller. The controller is further configured to recover at least one event and to communicate the at least one recovered event to the supervisory device during the event recovery.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 7 illustrates an example user interface supporting guaranteed batch event delivery in a process control system.

DETAILED DESCRIPTION

Figure 1:
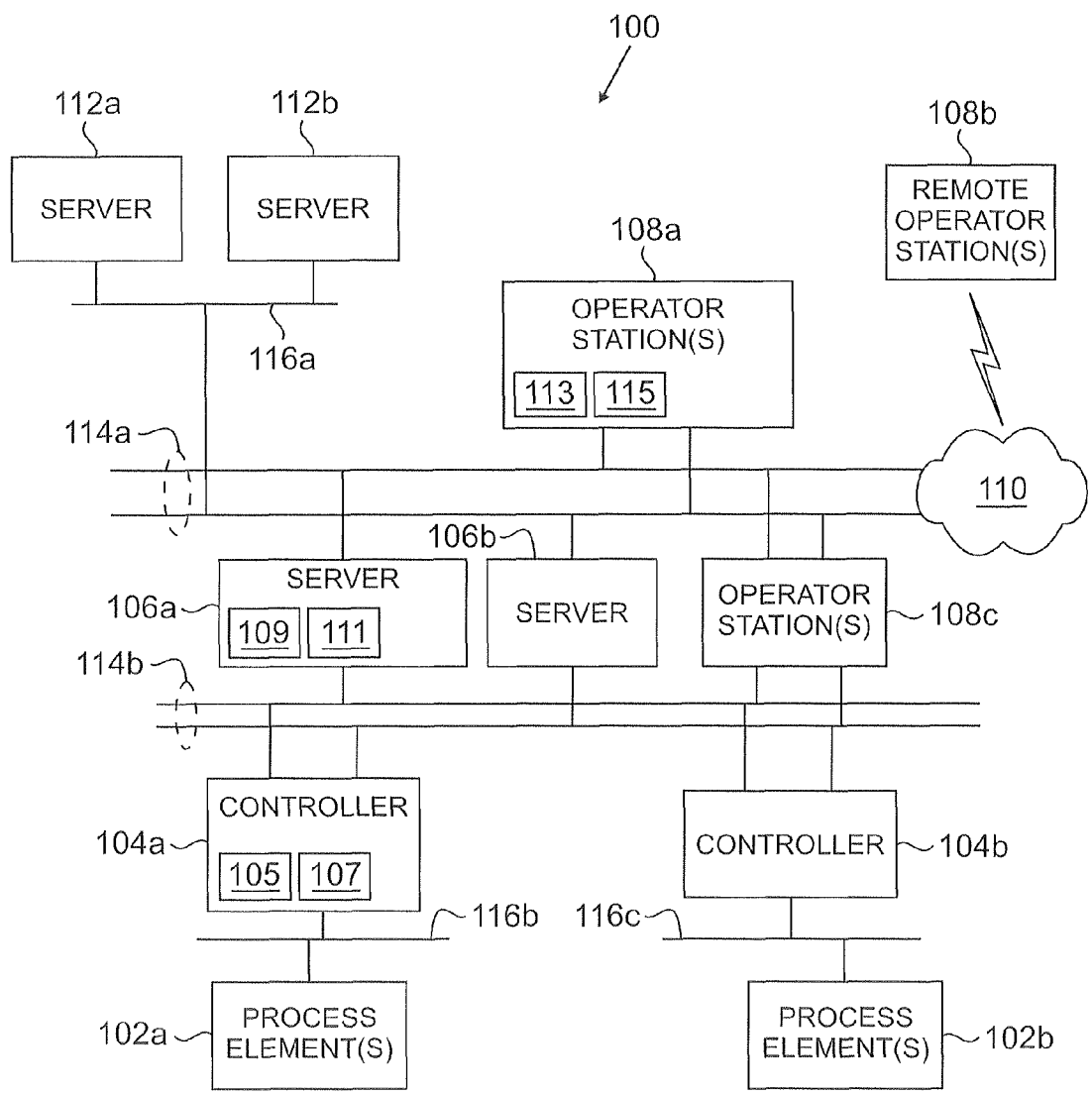
FIG. 1 illustrates an example process control system supporting guaranteed batch event delivery.

FIG. 1 illustrates an example process control system 100 supporting guaranteed batch event delivery. The embodiment of the process control system 100 shown in FIG. 1 is for illustration only. Other embodiments of the process control system 100 may be used without departing from the scope of this disclosure.

In this example embodiment, the process control system 100 includes one or more process elements 102a-102b. The process elements 102a-102b represent components in a process or production system that may perform any of a wide variety of functions. For example, the process elements 102a-102b could represent equipment used to manufacture chemical, pharmaceutical, paper, or petrochemical products. Each of the process elements 102a-102b includes any hardware, software, firmware, or combination thereof for performing one or more functions in a process or production system.

Two controllers 104a-104b are coupled to the process elements 102a-102b. The controllers 104a-104b control the operation of the process elements 102a-102b. For example, the controllers 104a-104b could be capable of providing control signals to the process elements 102a-102b for controlling the production of chemical, pharmaceutical, paper, or petrochemical products. Each of the controllers 104a-104b includes any hardware, software, firmware, or combination thereof for controlling one or more of the process elements 102a-102b. The controllers 104a-104b could, for example, include one or more processors 105 and one or more memories 107 storing instructions and data used, generated, or collected by the processor(s) 105. As particular examples, the processors 105 could include processors of the POWERPC processor family running the GREEN HILLS INTEGRITY operating system or processors of the X86 processor family running a MICROSOFT WINDOWS operating system.

Two servers 106a-106b are coupled to the controllers 104a-104b. The servers 106a-106b perform various functions to support the operation and control of the controllers 104a-104b and the process elements 102a-102b. For example, the servers 106a-106b could log information collected or generated by the controllers 104a-104b, such as status information related to the operation of the process elements 102a-102b. The servers 106a-106b could also execute applications that control the operation of the controllers 104a-104b, thereby controlling the operation of the process elements 102a-102b. In addition, the servers 106a-106b could provide secure access to the controllers 104a-104b. Each of the servers 106a-106b includes any hardware, software, firmware, or combination thereof for providing access to or control of the controllers 104a-104b. Each of the servers 106a-106b could, for example, include one or more processors 109 and one or more memories 111 storing instructions and data used, generated, or collected by the processor(s) 109 (such as software executed by the servers 106a-106b). As particular examples, the processors 109 could include processors of the POWERPC processor family running the GREEN HILLS INTEGRITY operating system or processors of the X86 processor family running a MICROSOFT WINDOWS operating system.

One or more operator stations 108a-108b are coupled to the servers 106a-106b, and one or more operator stations 108c are coupled to the controllers 104a-104b. The operator stations 108a-108b represent computing or communication devices providing user access to the servers 106a-106b, which could then provide user access to the controllers 104a-104b and the process elements 102a-102b. The operator stations 108c represent computing or communication devices providing direct user access to the controllers 104a-104b. As particular examples, the operator stations 108a-108c could allow users to review the operational history of the process elements 102a-102b using information collected by the controllers 104a-104b and/or the servers 106a-106b. The operator stations 108a-108c could also allow the users to adjust the operation of the process elements 102a-102b, controllers 104a-104b, or servers 106a-106b. Each of the operator stations 108a-108c includes any hardware, software, firmware, or combination thereof for supporting user access and control of the system 100. Each of the operator stations 108a-108c could, for example, include one or more processors 113 and one or more memories 115 storing instructions and data used, generated, or collected by the processor(s) 113 (such as software executed by the operator stations 108a-108c). In particular embodiments, the operator stations 108a-108c could represent personal computers executing a MICROSOFT WINDOWS operating system.

In this example, at least one of the operator stations 108b is remote from the servers 106a-106b. The remote station is coupled to the servers 106a-106b through a network 110. The network 110 facilitates communication between various components in the system 100. For example, the network 110 may communicate Internet Protocol (IP) packets, frame relay frames, Asynchronous Transfer Mode (ATM) cells, or other information between network addresses. The network 110 may include one or more local area networks (LANs), metropolitan area networks (MANs), wide area networks (WANS), all or a portion of a global network such as the Internet, or any other communication system or systems at one or more locations.

In this example embodiment, the system 100 includes two additional servers 112a-112b. The servers 112a-112b execute various applications to control the overall operation of the system 100. For example, the system 100 could be used in a processing or production plant or other facility, and the servers 112a-112b could execute applications used to control the plant or other facility. As particular examples, the servers 112a-112b could execute applications such as enterprise resource planning (ERP), manufacturing execution system (MES), or any other or additional plant or process control applications. Each of the servers 112a-112b includes any hardware, software, firmware, or combination thereof for controlling the overall operation of the system 100.

As shown in FIG. 1, the system 100 includes various redundant networks 114a-114b and single networks 116a-116c that support communication between components in the system 100. Each of these networks 114a-114b and 116a-116c represents any network or combination of networks facilitating communication between components in the system 100. The networks 114a-114b and 116a-116c could, for example, represent Ethernet networks.

In one aspect of operation, one or more of the controllers 104a-104b may generate batch execution events, which represent events that occur during controller operation in the process control system 100. The batch execution events generated by a controller 104a-104b are typically communicated to a supervisory server (such as one or more servers 106a-106b) for more permanent storage, such as in an event journal or other database. The batch execution events generated by a controller 104a-104b are also buffered or temporarily stored within the controller's memory. This supports the ability of the supervisory server to recover some or all of the events generated by a controller, such as events generated during periods when communication between the controller and the supervisory server has been interrupted. To support this event recovery, the system 100 provides a mechanism for tracking events and for resending "lost" or "missed" events to the supervisory server after an abnormal situation is cleared and the system 100 is back in normal operation.

In some embodiments, as batch execution events are generated within a controller 104a-104b, the events are numbered or otherwise identified in sequence with a unique identifier. Each of the events may, for example, be associated with an 8-byte numerical value as the events are generated or saved in the controller's event buffer. These unique identifiers are sent to the supervisory server along with the events. Upon receipt, the supervisory server examines the sequence of unique identifiers associated with the received batch events to identify potential gaps. If a gap is detected in the sequence of unique identifiers, this indicates that at least one event was not received by the supervisory server. The supervisory server then requests that the controller resend the missing or lost event or events (such as a specified event, events within a range of unique identifiers, or all events starting at a specific unique identifier). This helps to support the recovery of missing or lost batch events, thereby helping to ensure collection of all or substantially all events by the supervisory server for storage in event journals or other appropriate destination(s). In addition, if an event is permanently lost (it cannot be recovered due to event buffer overload in the controller or other reason), the system 100 may generate an alarm to notify a user.

In particular embodiments, when an event buffer in a controller 104a-104b is used, a user can configure the event buffer size. As particular examples, small, medium, and large event buffers could accommodate 120, 240, and 740 events, respectively. The user could select a proper buffer size based on any suitable criteria, such as the application in which the controller is used. Once the buffer size is selected, the controller 104a-104b may reserve the appropriate amount of space in its memory for the buffer.

Although FIG. 1 illustrates one example of a process control system 100 supporting guaranteed batch event delivery, various changes may be made to FIG. 1. For example, a process control system could include any number of process elements, controllers, servers, operator stations, and networks. Also, the makeup and arrangement of the process control system 100 is for illustration only. Components could be added, omitted, combined, or placed in any other configuration according to particular needs. Further, while described as being used to produce certain types of products, the process control system 100 could be used in any other manner. In addition, FIG. 1 illustrates one operational environment in which guaranteed batch event delivery can be used. Guaranteed batch event delivery could be used in any other device or system.

Figure 2:
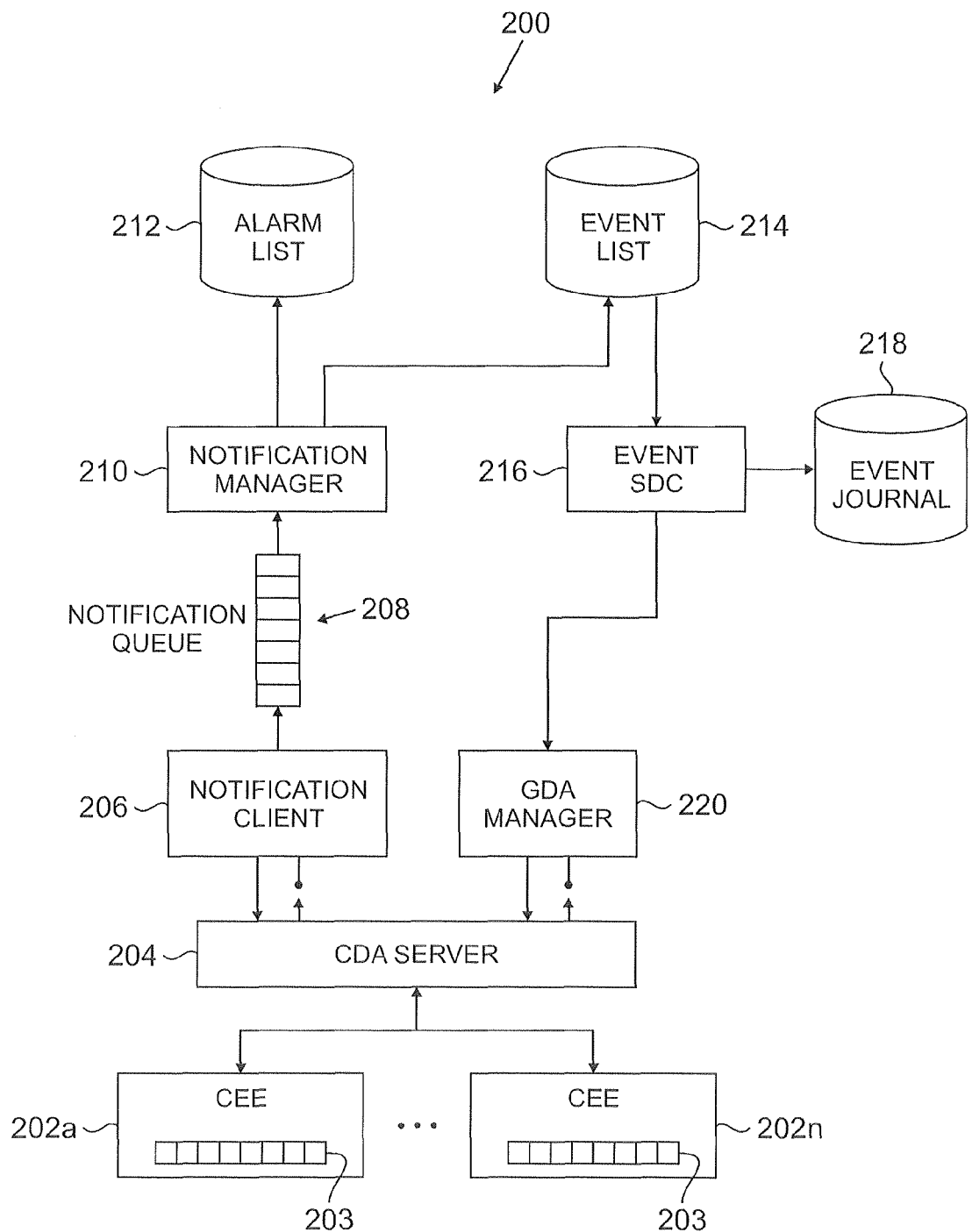
FIG. 2 illustrates additional details of an example process control system supporting guaranteed batch event delivery.

FIG. 2 illustrates additional details of an example process control system supporting guaranteed batch event delivery. In particular, FIG. 2 illustrates additional details regarding a particular implementation of the controllers 104a-104b and servers 106a-106b in the process control system 100 of FIG. 1. The additional details of the process control system shown in FIG. 2 are for illustration only. Other embodiments of the process control system 100 may be used without departing from the scope of this disclosure.

In this example, the process control system 100 includes one or more control execution environments 202a-202n. The control execution environments 202a-202n represent execution environments used or supported by the controllers 104a-104b in the process control system 100. The control execution environments 202a-202n may support a wide variety of functions, such as the scheduling and execution of various control and background tasks. One example of a control execution environment is provided in U.S. patent application Ser. No. 11/175,848, which is hereby incorporated by reference.

The control execution environments 202a-202n generate batch events, such as events related to the processing or production of a batch of a product. Regulated industries often require complete batch records of all aspects related to batch execution. The batch records can include the batch events captured as a part of the manufacturing of batch products. Non-regulated industries may not have the same requirements for complete batch records, but batch execution results may be captured for other reasons (such as quality assurance, continuous improvement, and process manufacturing optimization). As a result, it is often important or essential that all batch events generated by batch engines in the control execution environments 202a-202n be captured and stored in an event journal or other storage location(s). In this example embodiment, each of the control execution environments 202a-202n includes or supports an event buffer 203 for temporarily storing batch events generated by the control execution environments 202a-202n. As described below, this helps to facilitate the retrieval or recovery of lost or missing events, helping to ensure that the batch records in the process control system 100 are entirely or substantially complete. Each buffer 203 represents any suitable structure for storing and facilitating retrieval of batch events.

Due to memory limitations within controller products (such as purpose-built hardened controller platforms), batch execution events are typically transmitted on a timely basis to a supervisory server. Also, due to the nature of controller/server communications, there are times when a link or one or more of these platforms are not available. This may occur, for example, during redundant server failover, redundant controller failover, or interruption of a communication link between the controller and the server. The batch events that are generated in a control execution environment are retained within the event buffer 203 in the controller and sent to the supervisory server when the defined interruption no longer exists. For instance, the supervisory server can request the retransmission of events that the supervisory server determines are lost or missing. The following describes how the recovery of events from the control execution environments 202a-202n can occur.

The control execution environments 202a-202n are in communication with a control data access (CDA) server 204. The CDA server 204 provides secure data access to and from the control execution environments 202a-202n. For example, the CDA server 204 may ensure that only authorized sources (such as a supervisory server) are able to access and interact with the control execution environments 202a-202n. The CDA server 204 includes any hardware, software, firmware, or combination thereof for controlling data access.

A notification client 206 facilitates communication between the control execution environments 202a-202n (via the CDA server 204) and a notification queue 208. The notification client 206 may, for example, receive batch events from the control execution environments 202a-202n and provide the events to the notification queue 208 for storage. The notification client 206 includes any hardware, software, firmware, or combination thereof for providing access to the notification queue 208. The notification queue 208 includes any suitable structure for storing multiple events or other notifications.

The notifications from the notification queue 208 are retrieved by a notification manager 210. The notification manager 210 may, for example, retrieve batch events associated with the control execution environments 202a-202n from the notification queue 208. The notification manager 210 may then provide the notifications to one or more suitable destinations. For example, if a notification represents an alarm, the notification may be provided to an alarm list 212 for storage. If the notification represents an event, the notification may be stored in an event list 214. The notification manager 210 includes any hardware, software, firmware, or combination thereof for retrieving information from the notification queue 208. The alarm list 212 and the event list 214 represent any suitable structures for storing multiple notifications or other information.

Events from the event list 214 are retrieved by an event system data component (event SDC) 216, which stores the events in an event journal 218. The event SDC 216 also determines, using unique identifiers associated with the events, whether any events are missing or have been lost. For example, the unique identifiers could represent a sequence of numbers, and the event SDC 216 may identify missing events by identifying gaps in the unique identifiers associated with the received events. When the event SDC 216 needs to recover one or more lost or missing events from the control execution environments 202a-202n, the event SDC 216 may communicate with the notification client 206 or a generic data access (GDA) manager 220 (depending on the circumstances). Either of these components can request transmission or retransmission of one or more buffered events by the control execution environments 202a-202n. The event SDC 216 includes any hardware, software, firmware, or combination thereof for journaling events and identifying missing events. The event journal 218 includes any suitable structure for storing or journaling events, such as an SQL database. The GDA manager 220 includes any hardware, software, firmware, or combination thereof for providing access to the control execution environments 202a-202n.

In particular embodiments, the various components shown in FIG. 2 are divided between one or more of the controllers 104a-104b and one or more of the servers 106a-106b. For example, the control execution environments 202a-202n could reside in or be associated with multiple controllers, while the remaining components could reside in or be supported by a supervisory server.

In one aspect of operation, events may be buffered in the control execution environments 202a-202n, and the events can be associated with unique identifiers. A supervisory server (via the event SDC 216) can identify missing or lost events based on the unique identifiers associated with the events. If necessary, lost or missing events can be retransmitted from the control execution environments 202a-202n to the supervisory server.

Although FIG. 2 illustrates additional details of one example of a process control system supporting guaranteed batch event delivery, various changes may be made to FIG. 2. For example, the makeup and arrangement of the components in FIG. 2 are for illustration only. Components could be added, omitted, combined, or placed in any other configuration according to particular needs.

FIGS. 3A through 3D illustrate example data flows in a process control system supporting guaranteed batch event delivery. In particular, FIGS. 3A through 3D illustrate example data flows between the components of the process control system 100 that are shown in FIG. 2. The embodiments of the data flows shown in FIGS. 3A through 3D are for illustration only. Other data flows may be used without departing from the scope of this disclosure.

Figure 3A:
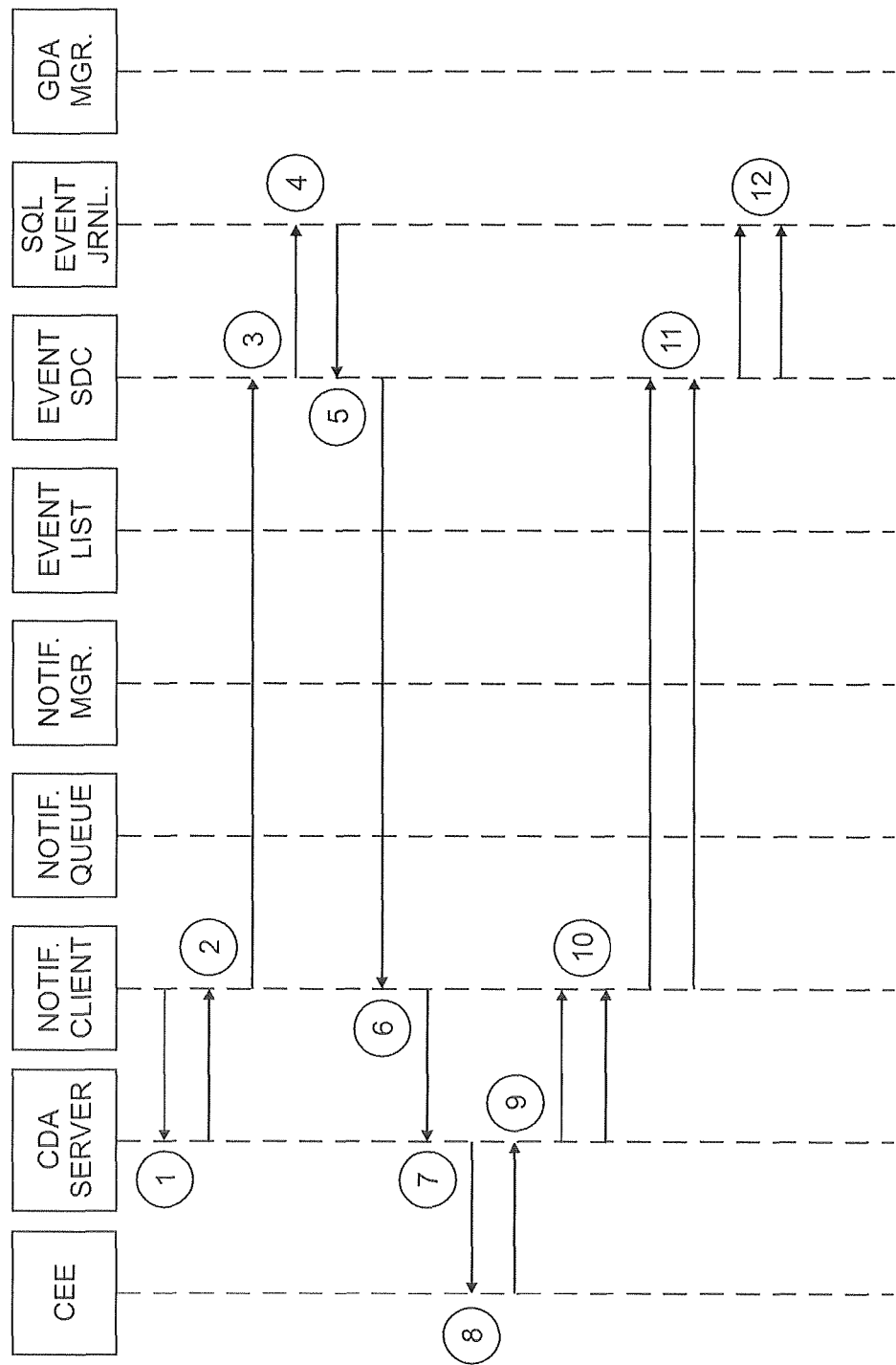
FIGS. 3A through 3D illustrate example data flows in a process control system supporting guaranteed batch event delivery.

The data flow in FIG. 3A may be used when a supervisory server is first starting up, meaning when the supervisory server is becoming active. In this case, the supervisory server may have missed events previously communicated by one or more controllers during the server's startup period. In this situation, the following sequence of events may occur.

(1) At server start-up, the notification client 206 subscribes to and receives a notification from the CDA server 204.

(2) The CDA server 204 obtains a list of control execution environments (CEE) 202a-202n that are capable of generating events, such as by using information from a system repository. The CDA server 204 returns the list of control execution environments to the notification client 206, such as by using a callback function.

(3) The notification client 206 queries the event SDC 216 for the sequence identifiers of the last events received by the event SDC 216 from the identified control execution environments.

(4) The event SDC 216 queries the event journal 218 if the event SDC 216 cannot resolve the notification client's query with its internal list.

(5) If necessary, the event journal 218 returns the list of last-received sequence identifiers from the identified control execution environments to the event SDC 216.

(6) The event SDC 216 passes this information to the notification client 206.

(7) The notification client 206 passes this information to the CDA server 204.

(8) The CDA server 204 requests an event recovery from each control execution environment by specifying, for each control execution environment, the appropriate sequence identifier received from the event SDC 216.

(9) Each control execution environment publishes its events starting at the sequence identifier requested by the CDA server 204.

(10) For each control execution environment, the CDA server 204 generates an event recovery begin bracket for that control execution environment and sends the begin bracket to the notification client 206. The begin bracket contains the sequence identifier of the corresponding request for event recovery and the sequence identifier of the first recovered event. The recovery bracket is followed by a chain of one or more recovered events.

(11) For each control execution environment, the recovered events are provided to the event SDC 216, which updates its internal list with the sequence identifier of the recovery begin bracket.

(12) The recovered events are journaled or logged into the event journal 218.

Figure 3B:
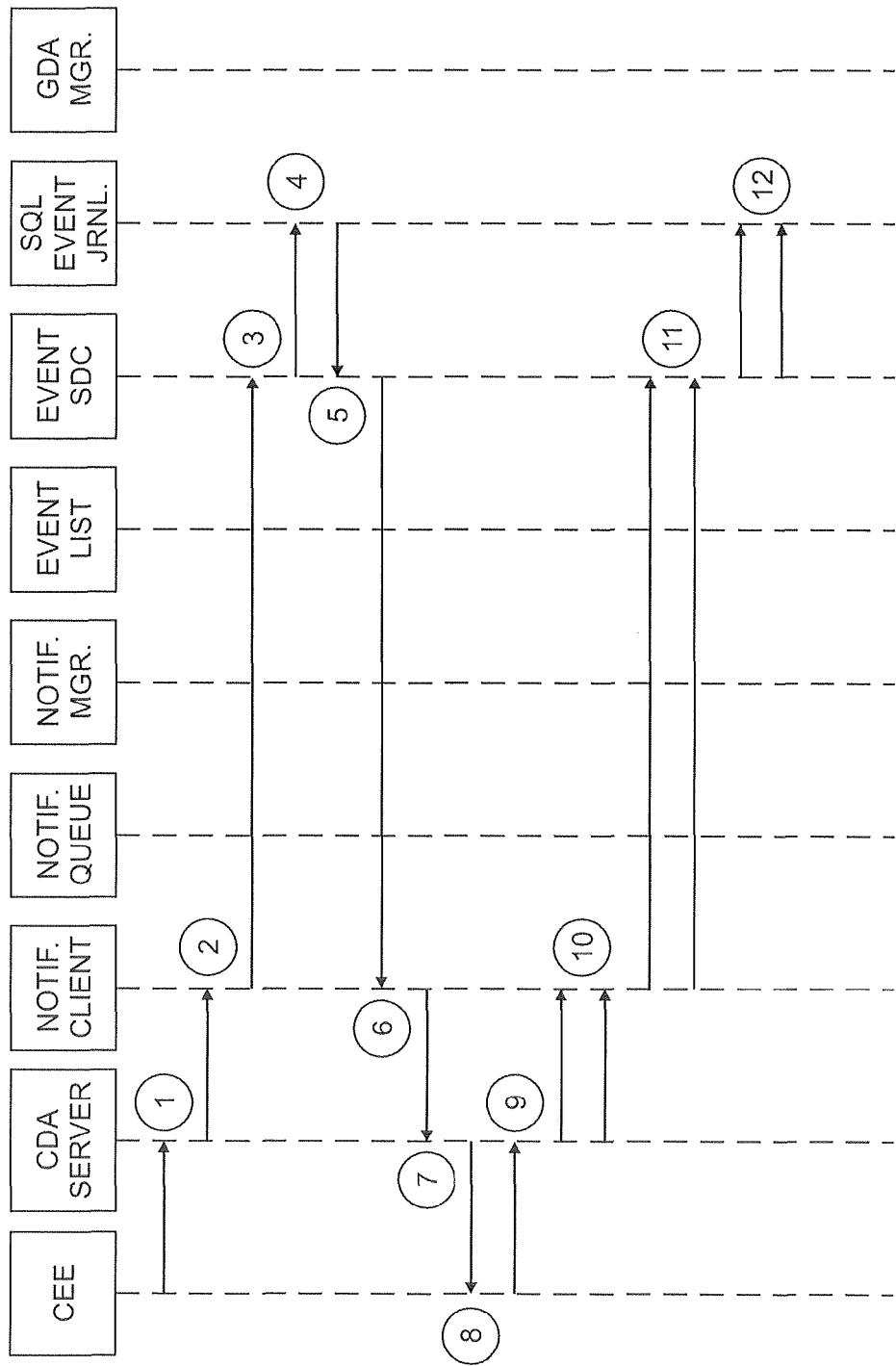

The data flow in FIG. 3B may be used when the controller restarts and reconnects to the supervisory server or when a cold reload of the controller occurs. During this time, the controller may be out of contact with its supervisory server, and some events may be generated. In this situation, the following sequence of events may occur.

(1) A control execution environment 202a-202n notifies the CDA server 204 that the controller has restarted.

(2) The CDA server 204 returns its code for the control execution environment with the execution environment's load time to the notification client 206, such as by using a callback function.

(3) The notification client 206 queries the event SDC 216 for the sequence identifier of the last event received by the event SDC 216 from the control execution environment.

(4) The event SDC 216 queries the event journal 218 if the event SDC 216 cannot resolve the notification client's query with its internal list.

(5) If necessary, the event journal 218 returns the last-received sequence identifier that was received from the control execution environment to the event SDC 216.

(6) The event SDC 216 passes this information to the notification client 206.

(7) The notification client 206 passes this information to the CDA server 204.

(8) The CDA server 204 requests an event recovery from the control execution environment by specifying the sequence identifier received from the event SDC 216.

(9) The control execution environment publishes its events starting at the sequence identifier requested by the CDA server 204.

(10) The CDA server 204 generates an event recovery begin bracket for the control execution environment and sends it to the notification client 206. The recovery bracket is followed by a chain of one or more recovered events.

(11) The recovered events are provided to the event SDC 216, which updates its internal list with the sequence identifier of the recovery begin bracket.

(12) The recovered events are journaled or logged into the event journal 218.

Figure 3C:
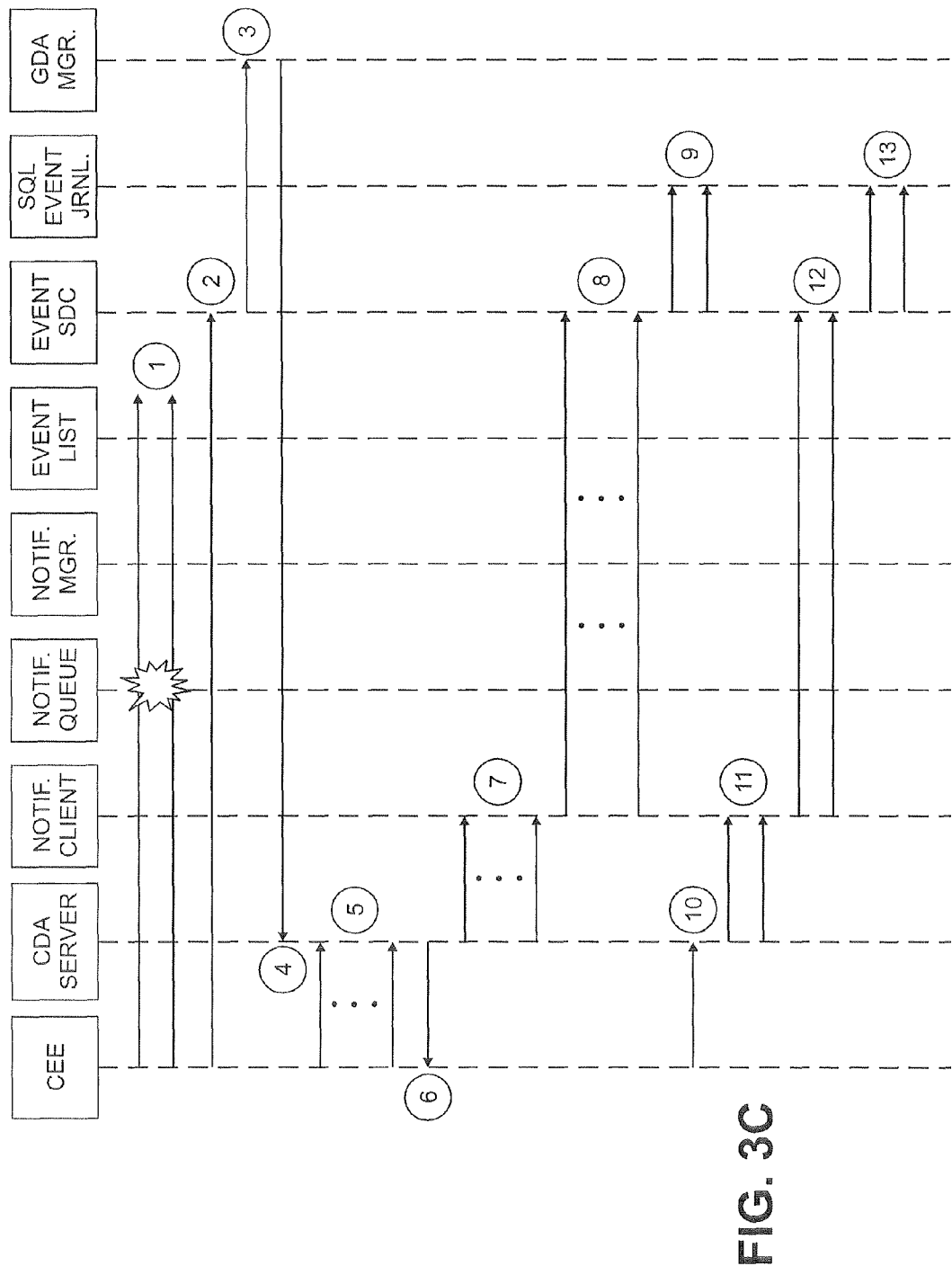

The data flow in FIG. 3C may be used when one or more events are lost. This could be caused by various reasons, such as a server failover, a controller failover, a network disruption, or excessive server load. In this situation, the following sequence of events may occur.

(1) One or more events are lost (for whatever reason), meaning one or more events transmitted from a control execution environment are not received or journaled properly by the event SDC 216.

(2) An event with an unexpected sequence identifier arrives at the event SDC 216. This event may have, for example, a numerical identifier that does not immediately follow the numerical identifier of the previously received event.

(3) The event SDC 216 commands an event recovery through the GDA manager 220 when it detects this occurrence.

(4) The CDA server 204 receives the recovery command.

(5) The control execution environment continues sending events that are not expected by the event SDC 216 (events that do not have the one or more missing numerical identifiers identified by the event SDC 216).

(6) The CDA server 204 requests an event recovery from the control execution environment and specifies the sequence identifier at which the recovery should begin.

(7) The unexpected events propagate to the notification client 206.

(8) The unexpected events reach the event SDC 216. The event SDC 216 may not update it internal list after receiving these unexpected events, and it may not re-command another recovery (at this point).

(9) The unexpected events are journaled or logged into to the event journal 218.

(10) The control execution environment publishes events starting at the sequence identifier requested by the CDA server 204.

(11) The CDA server 204 generates an event recovery begin bracket for the notification client 206, followed by a chain of one or more recovered events.

(12) The recovered events reach the event SDC 216, which updates its internal list with the sequence identifier of the recovery begin bracket.

(13) The events are journaled or logged into the event journal 218.

Figure 3D:
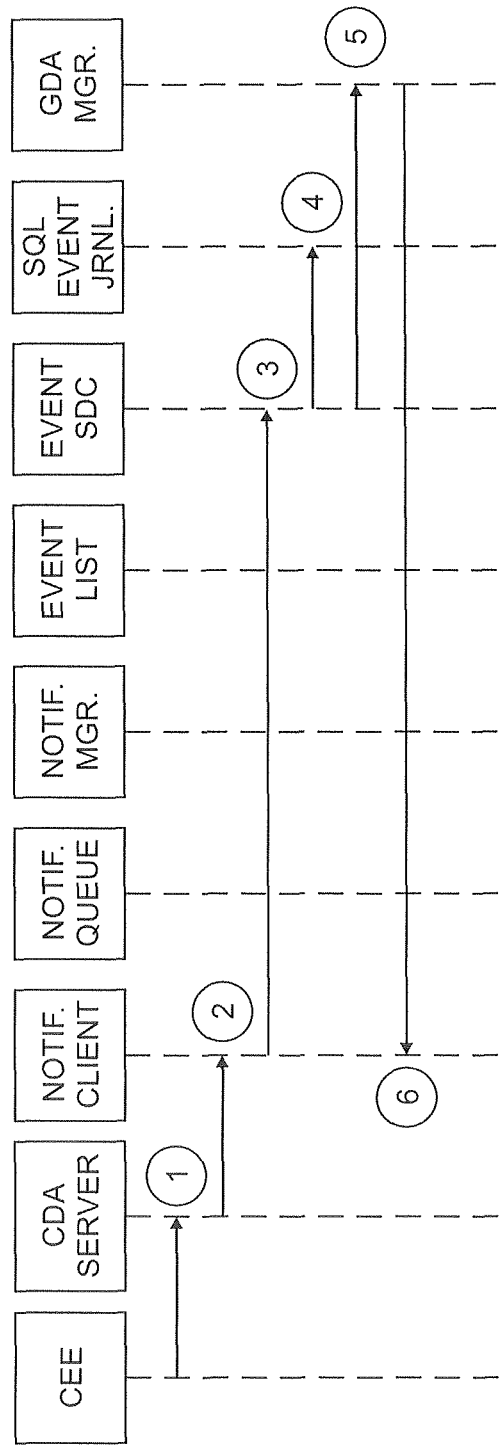

The data flow in FIG. 3D may be used when a control execution environment completes execution of a control recipe, which (as explained below) defines the production requirements for a specific product and is used to produce a single batch of the product. In this situation, the following sequence of events may occur.

(1) Upon completion of execution of a control recipe, the control recipe reports a recipe complete event to the CDA server 204.

(2) The CDA server 204 sends the recipe complete event to the notification client 206.

(3) The recipe complete event reaches the event SDC 216.

(4) The recipe complete event is journaled or logged into the event journal 218.

(5) If all recipe events have been journaled (the recipe complete event is in sequence and no events with unexpected sequence identifiers have been received), the event SDC 216 notifies the CDA server 204 via the GDA manager 220 that all recipe events for the control recipe have been journaled.

(6) The CDA server 204 receives the signal. At this point, the control recipe can now be safely removed.

Although FIGS. 3A through 3D illustrate examples of data flows in a process control system supporting guaranteed batch event delivery, various changes may be made to FIGS. 3A through 3D. For example, the events and other information may flow in any other suitable manner in the process control system. Also, other data flows could be used in other or additional situations in the process control system to support guaranteed batch event delivery.

Figure 4:
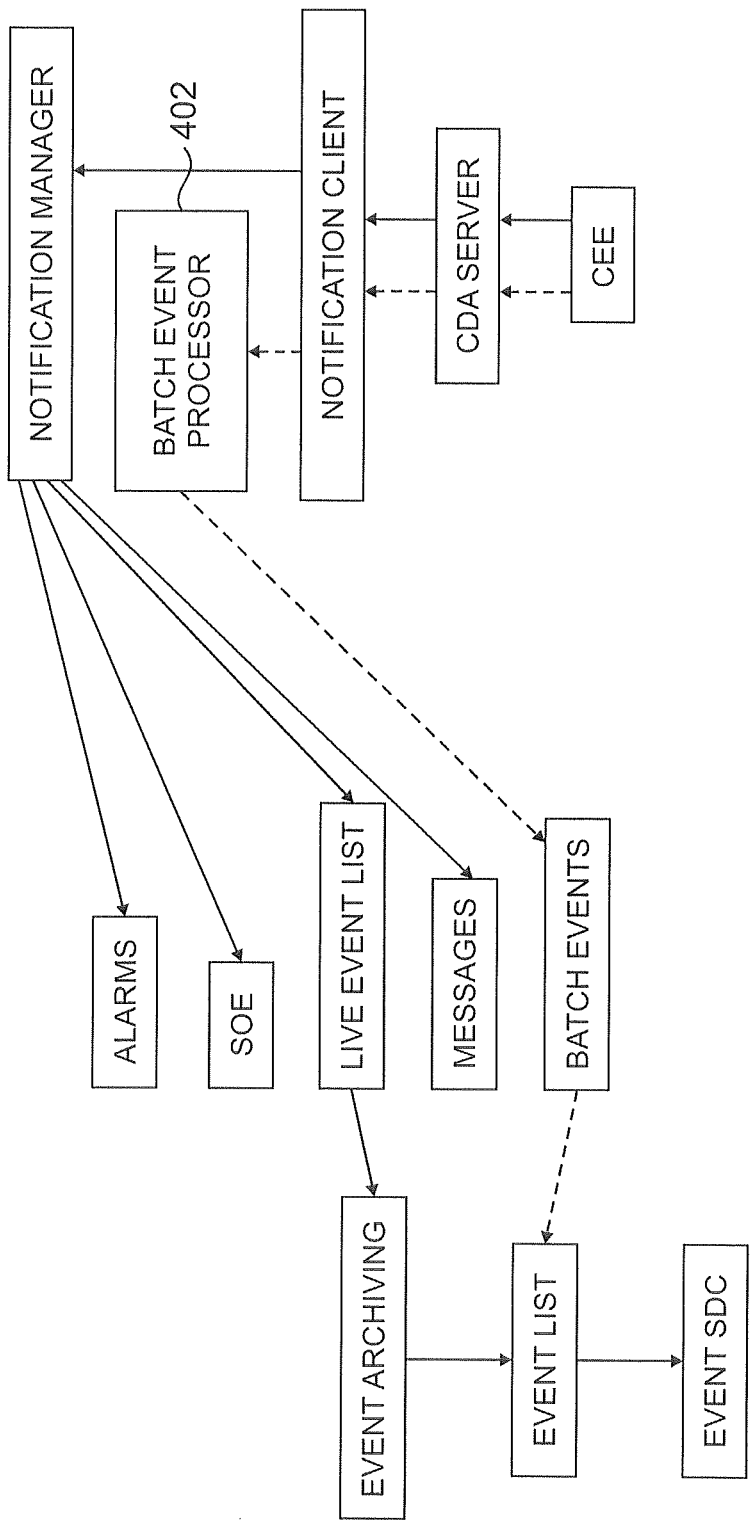
FIG. 4 illustrates example parallel data flows in a process control system supporting guaranteed batch event delivery.

FIG. 4 illustrates example parallel data flows in a process control system supporting guaranteed batch event delivery. In particular, FIG. 4 illustrates example data flows between the components of the process control system 100 that are shown in FIG. 2. The embodiments of the data flows shown in FIG. 4 are for illustration only. Other data flows may be used without departing from the scope of this disclosure.

In this example, the solid lines represent the normal data flow for notifications such as alarms, sequences of events (SOE), live events, and messages. These notifications generally flow from a control execution environment 202a-202n through the CDA server 204, the notification client 206, and the notification manager 210. Live events are archived in the event list 214 and are journaled by the event SDC 216. However, the number of certain types of events, such as events from control recipes, may be quite large depending on the application. As a result, the number of events may overwhelm existing alarm and system event generation mechanisms in process control systems.

To support the use of guaranteed batch event delivery, the process control system could include a separate data path (represented by the dashed lines) for batch events. This separate data path includes a batch event processor 402, which handles the processing of batch events and the insertion of the batch events into the event list 214. In this example, batch events are sent from the notification client 206 to the batch event processor 402 for handling, rather than to the notification manager 210. This allows certain batch events to bypass the notification manager 210 and be sent to the event list 214 directly, allowing the event SDC 216 to retrieve and journal the events without requiring the use of the notification manager 210.

Although FIG. 4 illustrates one example of parallel data flows in a process control system supporting guaranteed batch event delivery, various changes may be made to FIG. 4. For example, while shown as including a path for batch events and a path for all other notifications, the process control system could support any number of data paths for the notifications.

Also, parallel data flows may not be required in a process control system, and the batch event processor 402 could be omitted.

Figure 5:
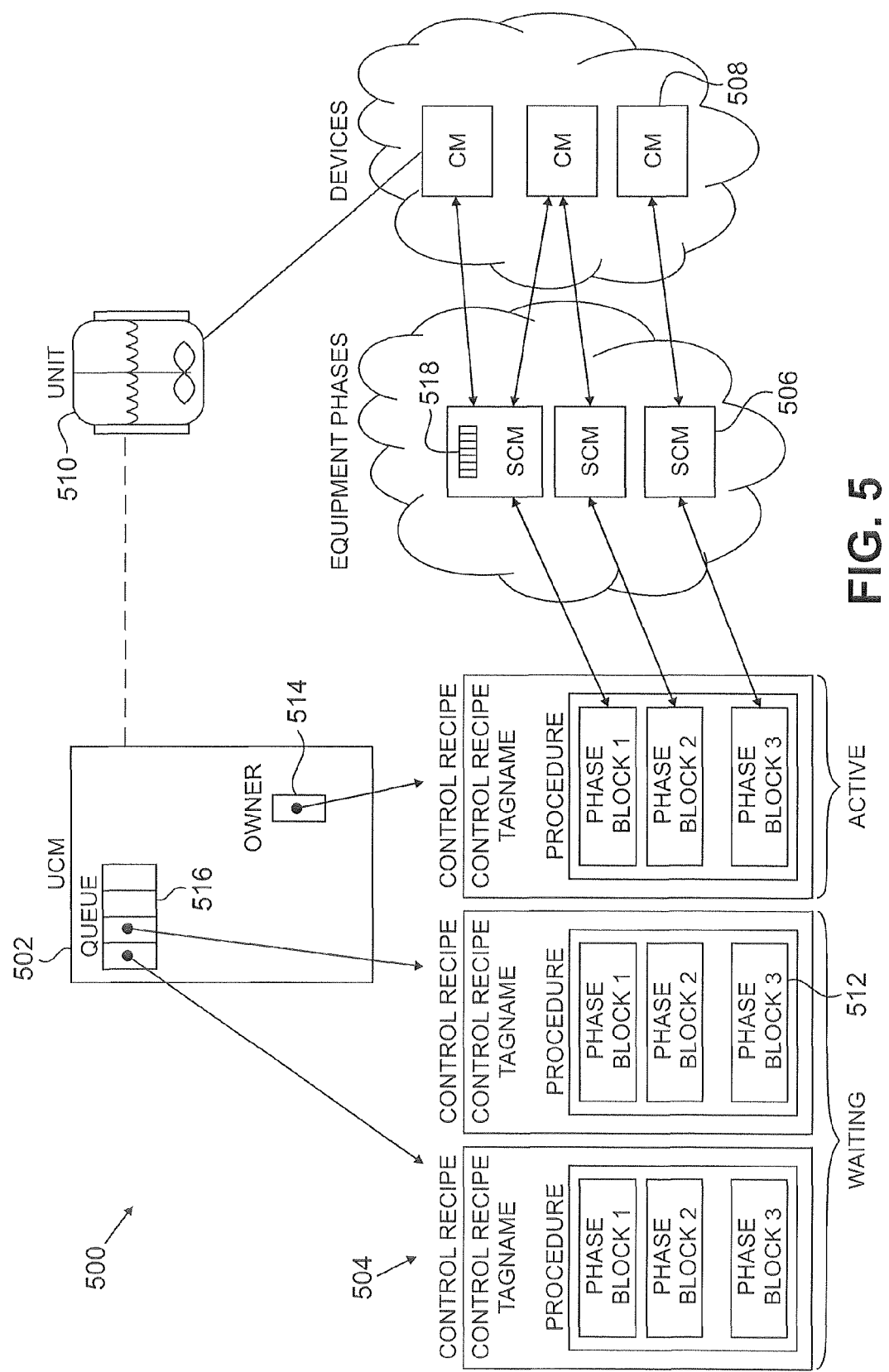
FIGS. 5 and 6 illustrate a specific example of a portion of a process control system supporting guaranteed batch event delivery.
Figure 6:
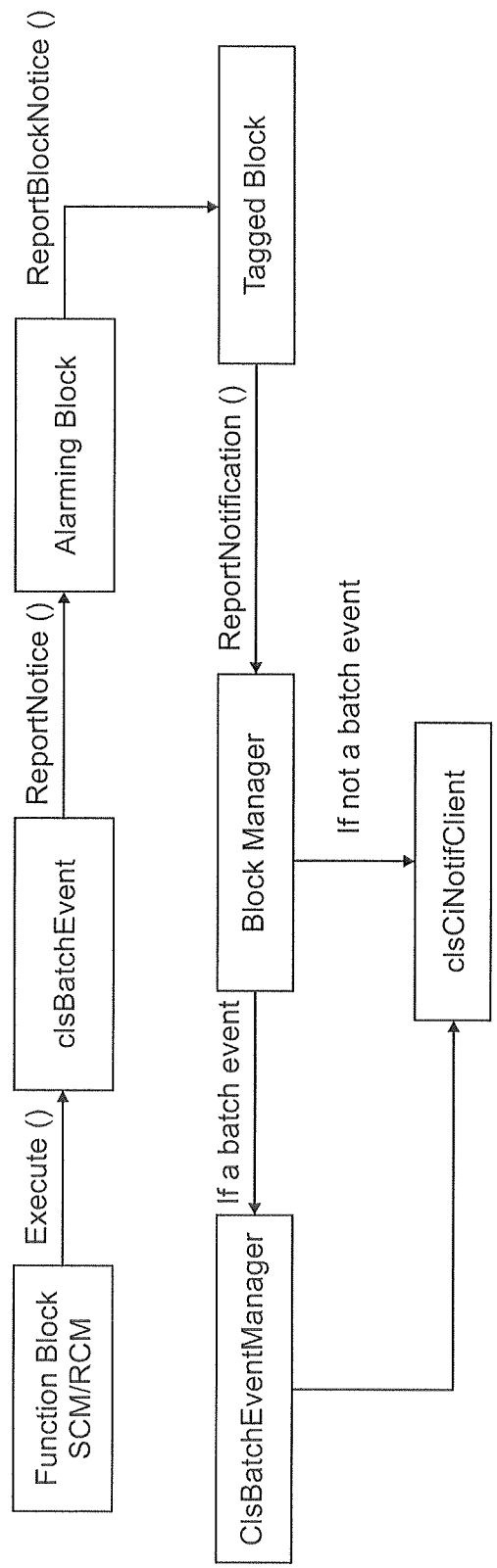

FIGS. 5 and 6 illustrate a specific example of a portion of a process control system supporting guaranteed batch event delivery. In particular, FIG. 5 illustrates an example process control system 500, and FIG. 6 illustrates an example mechanism supporting guaranteed batch event delivery in the process control system 500. The embodiment of the process control system supporting guaranteed batch event delivery shown in FIGS. 5 and 6 is for illustration only. Other embodiments of the process control system could be used without departing from the scope of this disclosure.

The process control system 500 shown in FIG. 5 could be implemented in any suitable system, such as by using the various components shown in FIGS. 1 and 2. As shown in FIG. 5, the process control system 500 includes one or more unit control modules (UCMs) 502, recipe control modules (RCMs) 504, sequential control modules (SCMs) 506, and control modules (CMs) 508. In some embodiments, the unit control modules 502, recipe control modules 504, sequential control modules 506, and control modules 508 are distributed across multiple control execution environments in the process control system 100, such as the controllers 104a-104b.

A unit control module 502 generally represents or is associated with a process unit 510 that contains one or multiple pieces of processing equipment, where use of the process unit 510 occurs after acquisition of the unit control module 502. As described in U.S. patent application Ser. No. 11/453,119, requester function blocks and resource function blocks can be invoked by, incorporated into, or otherwise used by the various control modules 502-508. The resource function blocks represent objects that can be acquired and released by the requester function blocks, where the requester function blocks use arbitration requests to attempt to acquire the resource function blocks. In these embodiments, a unit control module 502 can be acquired by a recipe control module 504, which allows the process unit 510 to be used during execution of the recipe control module 504.

A recipe control module 504 generally represents information defining the production requirements for one or more specific products (or parts thereof), where execution of a recipe control module 504 could result in the production of a single batch of the one or more products (or parts thereof). A recipe control module 504 could include a header, a procedure, a formula, and any equipment requirements. The procedure in a recipe control module 504 is defined by a set of phases represented by phase function blocks 512. Each phase of a recipe control module 504 is associated with a sequential control module 506, which interacts with one or more control modules 508 to implement one of the phases of the recipe control module 504. The control modules 508 provide access to and control over the actual process unit 510. The procedure in a recipe control module 504 could also include a set of step, transition, and synchronization blocks. Step blocks provide read/write access to the control modules 508, and synchronization blocks allow parallel execution of phase function blocks 512 or step blocks.

A recipe control module 504 manipulates the sequential control modules 506 through its phases, where the phases control the sequential control modules 506, monitor the execution states of the sequential control modules 506, and optionally propagate the execution states to the recipe control module 504. Phase function blocks 512 may also monitor their parent recipe control modules' states and propagate the states to their underlying sequential control modules 506 when their parent recipe control modules 504 enter abnormal states. In particular embodiments, the various control modules 504-508 could operate as defined by the International Electrotechnical Commission (IEC) 61131 and 61512 (including 61512-1) standards or in U.S. Pat. No. 6,317,638 (all of which are hereby incorporated by reference).

When a recipe control module 504 is created, it may optionally be associated with a specific unit control module 502. The unit control module 502 can be acquired when the recipe control module 504 is executed and can optionally be released by the recipe control module 504 at any time, such as when the recipe control module 504 reaches a terminal state or at any other previous time. Various parameters can be defined within the phase function blocks 512. These parameters may include a reference to a sequential control module 506 for execution control, a resource name to be allocated when a phase is started, and a flag indicating if the acquired resource will be released at the end of the execution of a sequential control module 506. By default, the resource name may be based on the selected sequential or recipe control module's name. If there is no selected sequential control module 506, a phase can be used for resource management purposes. Once in a terminal state, all resources acquired by the recipe control module 504 may or may not be released depending on the configuration flag.

In some embodiments, the unit control modules 502, sequential control modules 506, and control modules 508 may represent common resources that can be shared between multiple recipe control modules 504. As a particular example, a recipe control module 504 may generally need to acquire a unit control module 502 to execute its procedure. The recipe control module 504 could therefore acquire and release the unit control module 502 as needed. As another particular example, recipe control modules 504 can acquire the sequential control modules 506 and the control modules 508 they need in order to implement the production of a product.

An owner pointer 514 in the unit control module 502 identifies the recipe control module 504 currently being executed against the unit control module 502 (the recipe control module 504 that currently owns or has acquired the unit control module 502). An arbitration queue 516 identifies a specified number of recipe control modules 504 waiting to acquire the unit control module 502 to execute. When the current recipe control module 504 (identified by the owner pointer 514) releases the unit control module 502, the unit control module 502 can select the next recipe control module 504 from the queue 516 using any arbitration technique supported by the unit control module 502 or defined by the user (such as first-in, first-out or other technique). Similarly, the sequential control module 506 may include an arbitration queue 518. One or more recipe control modules 504 that are waiting to acquire the sequential control module 506 on behalf of its phase blocks are identified in the arbitration queue 518 of the sequential control module 506. The recipe control modules can be selected from the queue 518 in any order.

In general, a phase function block 512 in a recipe control module 504 represents a function block used to acquire, initiate execution of, and monitor execution of a sequential control module 506 or another recipe control module 504. For example, if a phase function block 512 is configured to execute a sequential control module 506, the phase function block 512 may acquire the sequential control module 506, load formula parameters into the sequential control module 506, and start the sequential control module 506. The formula parameters represent a set of parameters used by a phase to communicate appropriate recipe data to a sequential control module 506, such as data controlling how the process unit 510 is used during the phase execution.

While a sequential control module 506 is executing, the phase function block 512 may monitor the status of the sequential control module 506. The phase function block 512 may also project data from the sequential control module 506 so that SCM execution can be monitored by a recipe control module 504 through the phase function block 512. Further, the phase function block 512 may command the sequential control module 506 to upload various report parameters to the phase function block 512, such as when execution of the sequential control module 506 is complete or another terminal state is reached. Depending on the configuration, a phase function block 512 may or may not wait for the sequential control module 506 to complete before the phase completes, which allows the recipe control module 504 to proceed to the following phase or step. Moreover, depending on the configuration, the phase function block 512 may or may not release any acquired resources (such as the sequential control module 506) at the completion of the phase. In addition, the recipe control modules 504, phase function blocks 512, or other modules may generate and report batch events.

The process control system 500 may be used with the guaranteed batch event delivery mechanisms described above. For example, the following types of events could be generated in the process control system 500. In some embodiments, events can be generated at the control execution environment level, the sequential control module/recipe control module (SCM/RCM) level, and the SCM/RCM step and phase level. Event journaling can be enabled or disabled at each level, and enabling event journaling allows the reporting of specified events to the event SDC 216.

At the control execution environment level, a user may define how much memory is allocated for buffering the events (the size of the event buffer 203). The user can also enable or disable the journaling of all batch events or batch events for selected categories. The categories of events can include RCM/SCM execution, execution details, formula/recipe parameters, recipe headers, recipe resource allocations, and report/history parameters. The SCM events that can be added to the journal could include SCM/RCM execution starts, SCM/RCM execution termination states, SCM/RCM step starts, SCM/RCM step completes, RCM phase starts, RCM phase completes, SCM recipe parameter downloads (such as one event per parameter), SCM history parameter uploads (such as one event per parameter), RCM formula parameter downloads (such as one event per parameter), and RCM report parameter uploads (such as one event per parameter). An overall SCM/RCM event enable parameter can turn the entire SCM/RCM event reporting on or off (by default it can be set to "on" for RCM and to "off" for SCM).

The process control system 500 could provide for guaranteed batch event delivery using the mechanism shown in FIG. 6. In particular, the mechanism shown in FIG. 6 can be implemented within a control execution environment in a controller 104a-104b. This mechanism allows batch events to be buffered in the control execution environment. It may also prevent certain user actions or other actions, such as preventing the release or deletion of a recipe control module 504 before all events associated with that recipe control module 504 have been journaled and an acknowledgement has been received from the event SDC 216 (as explained with reference to FIG. 3D above).

As shown in FIG. 6, a function block (such as a sequential control module 506 or a recipe control module 504) is executed in the control execution environment. During its execution, the function block generates a new event, which is defined by a class denoted clsBatchEvent. The function block reports the new event using a ReportNotice( ) function to an alarming block, which results in a ReportBlockNotice( ) function being executed. The block is then tagged, meaning the event gets reported using a ReportNotification( ) function. A block manager makes a determination as to whether the event represents a batch event. If not, the notification is provided to the notification client 206 using a class clsCiNotifClient. Otherwise, an event manager is notified of the batch event. The event manager is associated with a class clsBatchEventManager, which could represent a cardinality 1 class used to process batch events and manage event recovery. The functionalities of this class may include the creation and maintenance of a buffer (such as a buffer 203) for storing event information, the generation of batch events, and the regeneration or recovery of lost or missing events. This class could also support interfaces for the addition of event information and maintain the sequence identifiers for the events. The event manager provides batch events with their associated sequence identifiers to the notification client 206.

In this example, a clsBatchEventManager object can be created during control execution environment startup. On creation of the clsBatchEventManager object, the sequence identifier for batch events in the control execution environment may be set to one or some other initial value.

In some embodiments, the memory for the buffer 203 may not be allocated during the creation of the clsBatchEventManager object since the size of the buffer 203 may not be fixed. Rather, the buffer size may be configured by a user, and the configuration data for the buffer 203 may not be available at the time that the clsBatchEventManager object is created. For example, the user may be provided with multiple options for the buffer size, such as none, small, medium, and large. These options could be provided in a control execution environment configuration form or in any other suitable manner. Once this parameter is selected and stored, a function in the clsBatchEventManager object may be invoked to create the memory required for the buffer 203. If the "none" option is selected, no memory is allocated for the buffer 203. Also, if memory is not available for the buffer 203, an exception can be returned.

In particular embodiments, the clsBatchEventManager object may be executed every base cycle of the control execution environment. Execution of this object may, for example, be part of the control execution environment's budgeted tasks. The only processing that the clsBatchEventManager object may perform in its execution time may be adding those batch events that were not previously added to a buffer in the CDA server 204. The number of events reported to the CDA server 204 every cycle may be limited (such as to five). The clsBatchEventManager object may provide an interface for adding event information to the CDA buffer to support this functionality.

When the supervisory server initiates an event recovery, it can send a request to the control execution environment with the sequence identifier of an event, indicating that this event was the last event received in sequence. This command is processed by the block manager, which could represent an unbudgeted task in the control execution environment. A method identifier may be used to distinguish the event recovery request from other requests (such as a parameter store). Upon processing the event recovery request, the block manager may invoke the clsBatchEventManager object to reset its index to a new index containing the event with the sequence identifier requested by the supervisory server. If event information to be recovered has already been overwritten in the buffer 203 of the control execution environment, an "event lost" alarm may be generated.

If the user selects a buffer size of "none," this indicates that non-guaranteed batch event delivery is used with the control execution environment. When the buffer size is none, no memory may be allocated for the buffer 203, and a batch event received from a recipe control module 504 or a sequential control module 506 is directly sent to the CDA server 204. To indicate that batch events are not guaranteed, a flag can be set in the CDA event structure to the appropriate value (such as false). A supervisory server, upon seeing the flag set to false, may not command event regeneration when events are missing.

The following represents specific details of a particular implementation of the guaranteed batch event delivery mechanism. These details are for illustration only. Other embodiments of a process control system that supports guaranteed batch event delivery could be used.

In particular embodiments, the class representing batch events (clsBatchEvent) can include definitions of appropriate values. These values could include a sequence identifier (used to identify missing or lost events), a batch identifier (used to identify a batch of product being produced or processed), and a sub-condition field. The structure of an event notification may, for example, have the following parameters:

```
UINT64 SeqId;              // Sequence number
clsCID SubCondCID;         // CID for sub-condition
// Data container that contains a text
// string associated with the notification.
DataContainerCreate<MAX_NOTIF_DC_BUFFER> StrValue;
```

The clsBatchEventManager object can include functions that are exposed to other classes. For example, the functions that are exposed to the block manager could include:

```
BOOLEAN IF_AddEvent ( eventstructure );    // Add event
Void IF_GenerateEvent ( )                  // Generate event
Void IF_EventRegenRequest (UINT64 SeqId)
                          // Resend lost or missing event(s)
void IF_AllocateBufferMemory (enumsize size)
                          //Create buffer
```

The basic information required to regenerate a batch event can be stored in the event buffer 203 as a structure, such as a structure defined as:

```
struct EventStructure
{
    DATETIME timestamp;
    IEEE_FLOAT64 Value;
    IEEE_FLOAT64 InfoField1;
    IEEE_FLOAT64 infoField2;
    UINT64 SequenceID;
    UINT64 ExecutionId;
    clsIOID BlockIOID;
    NM_SUBTYPE EventType;
    INT16 infoField3;
}
```

The size of this structure could be 60 bytes. To save memory, each field of the above structure can be used differently depending on the type of event being stored in the buffer 203.

There may also be multiple possible locations for the event buffer 203. For example, a single circular buffer could be maintained in the control execution environment, and all of the recipe control modules 504 and sequential control modules 506 assigned to the control execution environment may share the same buffer. The clsBatchEventManager object may be responsible for managing the buffer 203 and regenerating events in response to a recovery request. Since the buffer 203 is shared by all recipe control modules 504 and sequential control modules 506 in the control execution environment, it could be used more efficiently. For example, if some recipe control modules 504 or sequential control modules 506 do not have many events, the space in the buffer 203 can be used by the other recipe control modules 504 and sequential control modules 506 that have more events.

In other embodiments, each recipe control module 504 and each sequential control module 506 maintains its own circular buffer. In these embodiments, the control execution environment may only generate the unique sequence identifiers for the events.

The event buffer 203 could also be created in various ways. For example, the event buffer 203 could be created within a class as an array or in auxiliary memory. If created as a member of a class, unused or spare memory in a controller 104a-104b could be used for the buffer 203, such as 350 KB of memory. If created in auxiliary memory, a user may have an option to decide the size of memory allocated for the events buffer 203.

In some embodiments, a batch creation event may contain a batch identifier, which could represent a string. It may be difficult to allocate storage space for strings associated with all elements of the buffer 203. Since a batch creation event may not be generated as frequently as other events, only a few string objects may be allocated in a separate array called BatchIdBuffer. For batch creation events, a parameter in the event's structure may have an index to the batch identifier in the BatchIdBuffer array. The size of this buffer could be fixed, such as at 1/10 the size of the event buffer 203. Table 1 illustrates various possible sizes for the event buffer 203 and the associated BatchIdBuffer array.

TABLE 1

| Event Buffer Type | Capacity (Number of Events) | Size (in KB) | Capacity of BatchId Buffer | Size (in KB) | Total Size of buffers (in KB) |
|---|---|---|---|---|---|
| Small | 120 | 7.03 | 12 | 0.5 | 7.53 |
| Medium | 240 | 14.065 | 24 | 1 | 15.06 |
| Large | 720 | 42.18 | 72 | 3.3 | 45.48 |

A parameter of the enumeration type may be added to the definition file of a control execution environment for defining the size of the event buffer 203. Access to this parameter could be restricted, such as to developers only. This parameter could have a value of none, small, medium, or large (any of which could be the default). A SetEventBufferSize( ) function could store a value in this parameter. Upon a store of this parameter for a control execution environment, a call can be made to the clsBatchEventManager object, such as to an AllocateBufferMemory( ) function, in order to allocate the required memory for the buffer 203.

Once created, event information can be added to the buffer 203 via a call to an AddEvent( ) function. This call can be made in the block manager as part of the Report Notification( ) function. In case the buffer 203 was not created (such as because of the user's selection), the events may not be reported. The AddEvent( ) function could be defined as follows:

```
clsCiNotifClient::pInstance's AddNotification function:
Void clsBatchEventManager::AddEvent
    (strCkNotification * eventInfo)
{
If Buffer Allocated
    {
    if (LastElementIndex != MaxBufferSize)
        {
            LastElementIndex++;
        }
        else
        {
            // indicating that buffer is full and the first
            // element added has to be overwritten
            LastElementIndex = 0
        }
        struct EventStructure* BufferPtr = (struct
        EventStructure *)BufferAuxMem.GetPointer( )
            // extract the information from the strCkNotification
            // structure and store the value at
            // BufferPtr[LastElementIndex]
    }
}
```

The batch events can be added to the CDA buffer by the clsBatchEventManager object. The clsBatchEventManager object may be executed as part of control execution environment's budgeted tasks. During its execution time, the event manager object may generate batch events using the information present in the buffer 203. Since this is part of the control execution environment's budgeted tasks, the processing time of the event manager object may be kept to a minimum so as to avoid cycle overrun, while at the same time being long enough to generate events at an acceptable rate so that the buffer 203 does not overflow. With this consideration, the number of events generated in one execution cycle of the event manager object can be limited (such as to five). Since the event manager object can be executed periodically (such as every 50 ms), it can still generate 100 events per second with this throttling. Another reason that this number may satisfy the needs of the process control system is that other components in the process control system could handle a lesser amount of events, such as a maximum of 40 events per second. With this in mind, the clsBatchEventManager object could further be defined as follows:

```
Void clsBatchEventManager::EventGeneration( )
{
    MaxEvenstPerExecution = 5
    counter = 0
clsCiBatchEvent tempClsCiBatchEvt;
if Event Buffer Allocated
{
    struct EventStructure* BufferPtr =
        (struct EventStructure *)BufferAuxMem.GetPointer( )
    while (counter < MaxEvenstPerExecution And (there are
    events to be generated))
        {
            // copy information from BufferPtr[CurrentEventIndex]
            // to tempClsCiBatchEvt depending on the event type.
            if (clsCiNotifClient::pInstance->
            AddNotification(tempClsCiBatchEvt)) != FALSE)
            {
                If (CurrentEventIndex<MaxSize)
                    CurrentEventIndex ++ ;
                else
                    CurrentEventIndex = 0;
            }
            else
            {
                // CDA buffer might be full retry in next cycle
                break;
            }
            counter++
        }
    }
}
```

Event recovery can be commanded with a sequence identifier, which indicates that all events with sequence identifiers greater than the given sequence identifier should be regenerated. To handle an event recovery request, a method identifier can be used, and the event recovery can be processed as part of display request processing. In the case of event recovery, an interrupt mask register (IMR) may contain the sequence identifier. When the sequence identifier is 0, this indicates that the supervisory server is requesting regeneration of all events available in the buffer 203. A RegenEvents( ) function of the clsBatchEventManager object can be called with the sequence identifier. The RegenEvents( ) function may reset a CurrentEventIndex parameter to point to the event structure containing the sequence identifier that is one greater than the received sequence identifier. The events may then be regenerated during the next cycle of the event buffer's execution. With this in mind, the clsBatchEventManager object could further be defined as follows:

```
Void clsBatchEventManager::RegenEvents (UINT64 RecoverSeqID)
{
    if Buffer created
    {
    struct EventStructure* BufferPtr = (struct EventStructure *)
        BufferAuxMem.GetPointer( )
            if(RecoverSeqID > 0)
            {
                RecoverEventIdex = GetIndex( SeqId);
                // this function returns the index of the structure
                // whose sequenceId = RecoverSeqId
            }
            else
            {
                Recover EventIndex = First element in the buffer
            }
            if (Recover EventIndex == −1)
            {
                // this indicates that the event is not available in the
                // buffer. Generate an alarm indicating loss of events.
                RecoverEventIdex = GetNExtIndex(SeqID)
                //this function returns index of the first structure
                // having its sequenceId greater than RecoverSeqID.
            }
            CurentEventIdex = RecoverEventIdex;
    }
}
```

In the next execution of the clsBatchEventManager object, events may be regenerated from the requested sequence identifier.

Static information associated with function blocks (such as recipe control modules 504 and sequential control modules 506) may not be stored in the event buffer 203. This information, such as block names, may be stored elsewhere, such as in a system repository. When a block is deleted, this information may be lost, although the events generated by the deleted block might still exist in the event buffer 203 after the block has been deleted. In case these events are regenerated, a static information field may contain either default values or error values. These may not be acceptable to the user. To avoid this, a recipe control module 504 or a sequential control module 506 may not be deleted until all of the events generated by the module have been journaled. For example, a parameter AllowBlockDelete may be added to a recipe control module 504 or a sequential control module 506. If the module is not configured to generate events, the value of this parameter may be set to true. If the module is configured to generate events, the parameter is set to false. After the module has completed its execution, it generates a completion event. The supervisory server, on receiving the completion event, may initiate storage in the AllowBlockDelete parameter of the ExecutionID present in the complete event. If the ExecutionID matches the module's last run ExecutionID, the parameter AllowBlockDelete may be set to true. To delete a module, it may first be inactivated (such as when the module's state is idle). When the module is commanded to become inactive when it is in an idle state, the value AllowBlockDelete is checked. If AllowBlockDelete is true, the store of the ExecutionID in the parameter is allowed. If AllowBlockDelete is false, the store is not allowed to complete, the state of the module does not change, and a user is not allowed to change the module's state to inactive until all events generated by the module have been journaled (unless a "lost events" error is generated). If the supervisory server is offline, the store of the value in the AllowBlockDelete parameter may never occur, and the module might never be deleted. To overcome this, a parameter AllowForceDelete (which could be a Boolean parameter) can be added to the modules. When inactivation of a module is commanded, the value of the AllowForceDelete parameter is checked. If this value is true, the state change is allowed irrespective of the value of the AllowBlockDelete parameter.

When the supervisory server commands an event recovery for a sequence identifier that is not present in the buffer 203, the clsBatchEventManager object may generate an alarm indicating a loss of events and may start regenerating the events starting with the first event having a sequence identifier greater than the one requested. The alarm may contain the sequence identifier(s) of the lost event(s).

The BatchID buffer for storing batch identifiers might also be very limited. The BatchID buffer may work in a manner similar to the main event buffer 203. During the addition of a new batch identifier, the new identifier may overwrite the oldest identifier when the BatchID buffer is full. It is possible that the BatchID buffer is overwritten but the corresponding event entry is still present in the event buffer 203. In this case, when a RegenEvents( ) function call for this event is received, the event can be generated with a BatchID field containing an empty string.

Since the event buffer 203 can be created in auxiliary memory, it may exist throughout the existence of the control execution environment. In case of a controller reload or deletion, all of the cardinality 1 objects can be recreated, including the clsBatchEventManager object. Therefore, no special processing may be required for a controller reload or control execution environment deletion. Also, in case of a RAM retention restart, an auxiliary memory handle can be reconfirmed if memory had been allocated for the event buffer 203. Further, the auxiliary memory could undergo compaction, where data is moved in the auxiliary memory. When this occurs, the contents of the event buffer 203 need not be modified since the clsBatchEventManager object may not store memory pointers associated with the buffer 203 (so no pointers need to be updated in the buffer 203). Beyond that, no mechanism may be required for removing event information from the buffer 203. When implemented as a circular buffer, old event information is eventually overwritten with new event information. In addition, the clsBatchEventManager object may not be checkpointed (meaning batch events stored in the buffer 203 may be lost during a checkpoint restore), and the contents of the event buffer 203 in one controller can be tracked by a secondary or backup controller.

The block manager in FIG. 6 could include functions for handling batch event processing. Since batch event processing may be common to all platforms, the changes may be made in a common file for the block manager. The functions in the block manager could include a function for periodic execution, such as the following function:

```
PeriodicExecution(void)
{
    ...
    if (isPrimary( ) != FALSE)    // if controller is primary and
                                  // not secondary controller
    {
        ...
        clsBatchEventManager::pInstance->
        GenerateEvents( )
    }
}
```

The block manager could also include the ReportNotification ( ) function, which is responsible for filling the CDA notification structure and calling the AddNotification( ) function. When it receives a batch event, this function can fill the event structure and call the AddEvent( ) function in the clsBatchEventManager. This can be done using the following.

```
const BOOLEAN
    clsCkBlockManagerCommon::ReportNotification(strCkNotification*
    const CkNotif, const UINT32 TaggedBlockAlarmState)
    {
        NM_TYPE NotificationType = ((strCkNotice *)
        (CkNotif->BlockNotice->Notice))->NotifClass;
        if (NotificationType != NM_TYPE_BATCH_EVENT &&
            NotificationType!= NM_TYPE_PROCESS_ALERT )
        {
            ...
        }
        else if (NotificationType == NM_TYPE_BATCH_EVENT)
        {
            clsBatchEventManager::pInstance -> AddEvent(Event
            structure)
        }
    }
```

In addition, to support event recovery requests, a method identifier kBatchEvtRegen can be added to the enumerated method identifiers in the control execution environment. In case of an event recovery request, the clsBatchEventManager object's RegenEvents( ) function can be called with the sequence identifier present in the request. This can lead to the following.

```
BOOLEAN clsCkBlockManagerCommon::CkExecute (const
    enmDataAccess ListID, UINT32 NumIMRs)
{
    ...
    while (pRequest != NULL)
    {
        ...
        switch(MethodId)
        {
            ...
            case kBatchEvtRegen:
                get the requested SequenceId from CDA packet.
                clsBatchEventManager::pInstance->
```

```
            RegenEvents(RequestedSequenceID)
         }
      }
   }
}
```

If the various components shown in FIG. 5 (such as the recipe control modules 504 and the sequential control modules 506) are used in the process control system 100 as shown in FIG. 2, the components in FIG. 2 could be implemented as follows. These details represent one specific implementation of the process control system 100 as shown in FIG. 2 and do not limit the scope of this disclosure.

An interface between the CDA server 204 and the notification client 206 may support the following special events to help support guaranteed event delivery: a recipe event recovery begin bracket and a control recipe complete event. These events may be uniquely identified by event sub-types enumerated in the control execution environment.

To support guaranteed event delivery, each of the recipe events may have a unique 8-byte increasing sequence identifier, assigned in the order that the events are generated. These events may flow from the control execution environment to the event SDC 216 before they are journaled. Throughout this data flow, events may be subject to loss, and the sequence identifiers are used to keep track of any lost events. Each recipe event may also carry the load time of its control execution environment, which can be used to record the execution environment cycle at which the recipe event is generated. The load time may record the time of the execution environment's most recent controller reload. The sequence identifier, together with the execution environment code and the execution environment's load time, may form a unique identifier for a recipe event in the whole process control system. These three combined fields may therefore be used for commanding a recipe event recovery on a particular control execution environment. The sequence identifier field could represent a UINT64 value, and the load time field may represent a FILETIME value.

Since the CDA server 204 may request a recipe event recovery from a control execution environment starting at the sequence identifier that is one greater than the requested sequence identifier received from the event SDC 216, the sequence identifier for a recipe event may not be assigned a value of zero. In terms of recipe event recovery, requesting a sequence identifier of zero could represent a request to recover all events starting at the oldest recipe event in the control execution environment. Also, when a control execution environment reloads, its load time may be reset to the current time, and its sequence identifier may be initiated to a value of one. Resetting the control execution environment's load time may ensure the current cycle of sequence identifiers is uniquely identified. Subsequent recipe events may then have an increasing sequence identifier with the same execution environment load time.

The following functions may be used to form at least part of the interface between the CDA server 204 and the notification client 206. A GNotificationSubscribe( ) function can be called when the notification client 206 subscribes for notification from the CDA server 204 on server startup. This function may have a callback function, which acts as the entry point to the notification client 206 for CDA notifications to be passed to the CDA server 204. This function may also include another callback function to the CDA server 204 so that the CDA server 204 can obtain a sequence identifier of the last journaled recipe event from each control execution environment. The GNotificationSubscribe( ) function can be implemented as follows.

```
// Type definition for Notification Callback Function
typedef int (*FPNotification) (NM_NOTIFICATION*);
// Type definition for GetSeqIDs Callback Function
typedef int (*FPGetSeqIDs) (WORD*, FILETIME*, UINT64**);
// Function for subscribing to notifications
CDAFUNC G_Status APIENTRY GNotificationSubscribe
(
   // Callback through which notifications are passed to the
   // client
   FPNotification pfnNotifCallback
   // Callback through which CDA server gets the list of SeqIDs
   FPGetSeqIDs pfnGetSeqIDsCallback
)
```

A GRecipeEventRecovery( ) function may be used in the CDA server/notification client interface so a recipe event recovery from a control execution environment can be initiated when a loss of recipe events is detected. For example, the event SDC 216 may detect an out-of-order recipe event, such as an event having a sequence identifier higher than the expected sequence identifier for the execution environment. In this case, the event SDC 216 determines that one or more recipe events have been lost, and it calls this function through the GDA manager 220 to command a recipe event recovery for that execution environment. Supplied with this function are the execution environment's code, the execution environment's load time, and the sequence identifier of the recipe event at which the recovery begins. These three fields may uniquely identify the starting point for the recovery process. Upon receiving this command, the CDA server 204 requests a recipe event recovery from the execution environment starting at a sequence identifier that is one greater than the requested sequence identifier from the event SDC 216. The notification client 206 may receive the recovered recipe events through the same notification callback function. The first event in the recovery process may be the recipe event begin bracket, and it may be followed by one or more subsequent recipe events that have been recovered. The GRecipeEventRecovery( ) function could be defined as follows.

```
// Function to trigger a recipe event recovery from the execution
/ environment starting at the sequence ID requested
CDAFUNC G_Status APIENTRY GRecipeEventRecovery
(
   const WORD NmEECode,
   const UINT64 NmSeqID,
   const FILETIME NmLoadTime
)
```

A GControlRecipeComplete( ) function provides the supervisory server with the ability to notify the CDA server 204 that it has journaled all recipe events for a particular control recipe's execution. The event SDC 216 may call this function through the GDA manager 220 when it receives a control recipe complete event and the event SDC 216 has journaled all recipe events for the control recipe. This function may have a parameter that passes the batch identifier of the completed control recipe to the CDA server 204. The event SDC 216 may obtain the batch identifier for the completed control recipe from the appropriate field in the control recipe complete event. The CDA server 204 may or may not need more information to identify the control recipe (such as an execution environment code or load time or a control module name). The GControlRecipeComplete( ) function could be defined as follows.

```
// Function to signal CDA server that all recipe events for the
// control recipe are journaled
CDAFUNC G_Status APIENTRY GControlRecipeComplete
(
    const UINT32    NmBatchID
)
```

During event recovery, the recovered events are preceded by a recipe event recovery begin bracket. The recipe event recovery begin bracket may be sent when the notification client 206 makes a notification subscription or when the event SDC 216 commands a recipe event recovery to the CDA server 204. This begin bracket, along with the recovered recipe events, are originated from the control execution environment. The begin bracket may be the first event in the recovery process, and it marks the start of a sequence of one or more recovered recipe events to follow. The CDA server 204 may send this event to the notification client 206 through the usual notification mechanism. The notification client 206 may be the only recipient of this event, and it may not be distributed to console stations or other devices. A special sub-type may used to identify a recipe event recovery begin bracket. This sub-type may contain the sequence identifier requested by the event recovery and the sequence identifier of the first available recipe event recovered.

In normal circumstances, when the buffer 203 of recipe events in the control execution environment can service the recovery request, the returned sequence identifier may be one greater than the requested sequence identifier. However, if the buffer 203 in the control execution environment has overwritten the requested recipe event at which the event recovery was to begin, the execution environment may have to recover any remaining events starting with the oldest recipe event still in the buffer 203. In this case, the returned sequence identifier in the begin bracket would be the sequence identifier of the oldest recipe event recovered. Also, the control execution environment may generate a self-acknowledged alarm when it cannot recover all of the requested recipe events. The recipe event recovery may or may not require an end bracket. Additional details regarding the recipe event recovery begin bracket are provided in Table 2.

TABLE 2

| Field | Value |
|---|---|
| NmCategory | NC_BATCH_EVENT |
| NmType | NM_TYPE_BATCH_EVENT |
| NmSubType | NM_SUBTYPE_RECIPE_EVENT_RECOVERY |
| NmEECode | Execution environment code |
| NmPriority | NM_PRIORITY_JOURNAL |
| NmUnikId | Batch identifier |
| NmSeqId | Sequence identifier of the initial recipe event published for the recovery process (requested) |
| NmValue (overloaded) | Starting sequence identifier for which recipe events are commanded to recover (returned) |
| NmLoadTime | Load time of the execution environment |
| szAuxDesc | Description for this event, such as "Recipe event recovery for execution environment" |

The supervisory server may treat this recipe event recovery begin bracket as a journal-only event. It may therefore go into the event list 214, be displayed in an event summary, and may eventually reach the event SDC 216 and be journaled into the event journal 218.

The notification client 206 may check all received notifications to see whether it receives a recipe event recovery begin bracket. If it does, the notification client 206 may set a flag in the notification queue packet associated with the begin bracket to identify it. When this event reaches the event SDC 216, the event SDC 216 may identify the event using this flag and may update its internal list with the returned sequence identifier stored in the event's value field. This update may be done only if the sequence identifier in the in-memory list is less than the returned sequence identifier. This mechanism may be used to avoid the event SDC 216 from infinitely requesting recoveries for lost recipe events that have been wrapped-around in the control execution environment buffer 203.

A recipe event recovery begin bracket could be lost during transmission. To overcome this problem, if the event SDC 216 does not receive the begin bracket after commanding a recipe event recovery, it may continue to journal subsequent recipe events received and update its internal list if it has the next expected sequence identifier. It may not re-command another recipe event recovery until it has received the begin bracket or until some time (such as 30 seconds) has passed from the first commanded recovery. It may be assumed that the recipe events that follow the recipe event begin bracket are always in sequence (if disruption does not occur).

Upon completion of a recipe execution, the control recipe may report a control recipe complete event with its batch identifier. The batch identifier may be stored in a unique identifier field in the notification structure. This event may have a special sub-type to indicate that it is the last event from the control recipe. Like other recipe events, it may also contain a sequence identifier, and the identifier may represent the next increasing sequence identifier that follows the last recipe event sent by the recipe execution. Additional details regarding the control recipe complete event are provided in Table 3.

TABLE 3

| Field | Value |
|---|---|
| NmCategory | NC_BATCH_EVENT |
| NmType | NM_TYPE_BATCH_EVENT |
| NmSubType | NM_SUBTYPE_CR_COMPLETE |
| NmEECode | Execution environment code |
| NmPriority | NM_PRIORITY_JOURNAL |
| NmUnikId | Batch identifier |
| NmSeqId | Sequence identifier of the last recipe event + 1 |
| NmLoadTime | Load time of the execution environment |
| szAuxDesc | Description for this event, such as "Recipe completed" |
| NmValue | Batch identifier |

When the notification client 206 detects this event, it may set a flag in the notification queue packet associated with the control recipe complete event before posting it into the notification queue 208.

When this event reaches the event SDC 216, if the sequence identifier for the control recipe complete event matches the next sequence identifier expected by the event SDC 216, it means that the event SDC 216 has successfully received and journaled all recipe events for the recipe. It may then call a hsc_gda_control_recipe_complete( ) GDA API function to signal the CDA server 204 that the control recipe can be deleted. The CDA server 204 may prevent the deletion of the control recipe until signaled by the event SDC 216. If the event SDC 216 detects a sequence identifier mismatch for the control recipe complete event, it means that not all recipe events for the recipe execution are journaled, and it may invoke a recipe event recovery to retrieve the lost events. There can be situations where a control recipe has completed its execution and the control recipe complete event is sent but is lost before it reaches the event SDC 216. As a result, the CDA server 204 may be stuck waiting for a signal from the event SDC 216. A mechanism to recover from this state can be provided, such as when the CDA server 204 or control execution environment re-announces the recipe complete event after some timeout.

The notification client 206 itself may also support various functions to enable guaranteed event delivery in the process control system. Among other things, this may include handling the recipe event recovery begin brackets and the control recipe complete events. As mentioned above, the notification client 206 may set a flag for the notification queue packets for these special events before putting them into the notification queue 208. The flags may be defined as follows.

```
prtque_def
// Recipe event recovery begin bracket event
#define PRQ_CR_RECOVERY_BRACKET_MASK    // field mask
  0x0004
#define PRQ_CR_RECOVERY_BRACKET_ 0x0004
#define PRQ_CR_RECOVERY_BRACKET___BIT 3  // bit position
// Control recipe complete event
#define PRQ_CR_COMPLETE_EVT_MASK 0x0004  // field mask
#define PRQ_CR_COMPLETE_EVT 0x0004
#define PRQ_CR_COMPLETE_EVT_BIT 4        // bit position
```

Two similar flags may be added to a definition file so that the notification manager 210, when it processes the notification packets for the two events from the notification queue 208, also sets the corresponding flags on the event file record structure before putting the events into the event list 214. Thus, the event SDC 216 may know how to detect these events when they arrive and respond accordingly.

In situations when the CDA server 204 knows that a recipe event recovery is required, the CDA server 204 may not know the recipe event at which to start the recovery and may not know what events have been journaled. The CDA server 204 may obtain this from the event SDC 216, where the information is available. To achieve this, a callback function may be added to the notification client 206. The notification client 206 callback function, denoted nc_get_SeqID_for_EEs( ), may provide the CDA server 204 an entry point for querying the sequence identifier of the last-journaled recipe event received from each controlled execution environment. This callback function can be passed to the CDA server 204 when the notification client 206 subscribes to notification on server startup. As mentioned above, it may be passed as a parameter in the GNotificationSubscribe( ) function. The call function nc_get_SeqID_for_EEs( ) may receive a list of "recipe event-capable" execution environments and their load times as input parameters and may return a list of sequence identifiers that aid in recipe event recovery from the execution environments. It may be called by the CDA server 204, for example, in the following situations: the notification client 206 subscribes to notification from the CDA server 204, a controller restart/reconnect, and a controller cold reload. This kind of recipe event recovery may be considered as a CDA server-activated recovery. It may be slightly different from a recipe event recovery initiated by the event SDC 216 in that it is initiated in a different component due to different reasons. When the callback function is called, it may query the event SDC 216 for the list of sequence identifiers through a getSequenceIDs( ) method. It may then return this information to the CDA server 204. Upon receiving this information from the callback function, the CDA server 204 may request a recipe event recovery from the execution environments. The definition of the notification client 206 callback function is provided below.

```
int hsc_nc_get_SeqID_for_EEs(int NumOfEE, WORD* EEs,
FILETIME* LoadTimes, UINT64** SequenceIDs)
// Query event SDC to get the last sequence ID received from each
// execution environment and return list of sequence IDs to CDA
// server
// RETURN VALUES:
// FP_GET_SEQID_ERROR if an error occurs when querying for the
//         sequence IDs
// FP_GET_SEQID_OK if sequence IDs are obtain successfully
// FP_GET_SEQID_CANCEL if Main Thread believes this thread
// should be dead
```

The GDA manager 220 may further support various functions to enable guaranteed event delivery in the process control system. For example, the GDA manager 220 may support API functions for accessing the CDA server 204. Two CDA API functions that may be used for event recovery could include: hsc_cda_recipe_event_recovery( ) and hsc_cda_control_recipe_complete( ). These methods may call the GRecipeEventRecovery( ) and GControlRecipeComplete( ) CDA notification functions, respectively. Additional details about these CDA API functions are shown below.

```
//------------------------------------------------------------
// HSC_CDA_RECIPE_EVENT_RECOVERY - calls for
a recipe event recovery
//------------------------------------------------------------
// SUMMARY:
// Call GRecipeEventRecovery
// If status is not OK then raise alarm
void hsc_cda_recipe_event_recovery(int2 EE, HSCTime LoadTime,
    int8 SeqID);
//------------------------------------------------------------
//HSC_CDA_CONTROL_RECIPE_COMPLETE -    signals that all
                                      recipe events
//                                    for the CR is
                                      journaled
//------------------------------------------------------------
// SUMMARY:
// Call GControlRecipeComplete
// If status is not OK then raise alarm
void hsc_cda_control_recipe_complete(int4 BatchID);
```

Other methods that could be used or supported by the GDA manager 220 may include RecipeEventRecover( ) and ControlRecipeComplete( ). Calling these two methods may result in the corresponding hsc_cda_recipe_event_recovery( ) and hsc_cda_control_recipe_complete( ) CDA API methods being called. Below are more details about these two methods.

```
HRESULT RecipeEventRecover (
    //PARAMETERS
    [in] int2 EE,            // Execution environment (EE) code
    [in] HSCTime LoadTime,   // Load time for the EE
    [in] int8 SeqID,         // Sequence IDs for recovery
    [out] GDAERR *pStatus);  // Status returned for request
    //REMARKS
    //   Only CDA recipe event recoveries may be done via this
    //   method. No GDA recoveries may be needed.
    //RETURN VALUES
    //   S_OK      - The method call was successful
    //   S_FALSE   - The method call was partially successful, the
    //              error is returned in pStatus.
```

```
//      failed HRESULT - The method call failed
    HRESULT ControlRecipeComplete (
        //PARAMETERS
        [in] int4 BatchID, // Batch ID of the completed control recipe
        [out] GDAERR *pStatus); // Status returned for request
        //REMARKS
        //   Only CDA control recipe complete signals may be done via
        //   this method. No GDA may support this method.
        //RETURN VALUES
        //   S_OK      - The method call was successful
        //   S_FALSE   - The method call was partially successful, the
        //              error is returned in pStatus.
        //   failed HRESULT - The method call failed
    HRESULT RecipeEventRecover (
        //PARAMETERS
        [in] int2 EE,              // EE code
        [in] HSCTime LoadTime,     // Load time for the EE
        [in] int8 SeqID,           // Sequence IDs for recovery
        [out] GDAERR *pStatus);    // Status returned for request
        //REMARKS
        //   Clients call this method to initiate a recipe event
        //   recovery from the server.
        //RETURN VALUES
        //   S_OK - The method call was successful
        //   failed HRESULT - The method call failed
    HRESULT ControlRecipeComplete (
        //PARAMETERS
        [in] int4 BatchID,         // Batch ID
        [out] GDAERR *pStatus);    // Status returned for request
        //REMARKS
        //   Clients call this method to signal the CDA server that
        //   all recipe events for the CR execution are journaled.
        //RETURN VALUES
        //   S_OK   - The method call was successful
        //   failed HRESULT - The method call failed
```

Two additional GDA API functions could be used in the GDA manager: hsc_gda_recipe_event_recovery( ) and hsc_gda_control_recipe_complete( ). These methods may call the RecipeEventRecover( ) and ControlRecipeComplete( ) GDA methods, respectively. Details about these two functions are provided below.

```
//-----------------------------------------------------------
// HSC_GDA_RECIPE_EVENT_RECOVERY - calls for a recipe event
// recovery
//-----------------------------------------------------------
void hsc_gda_recipe_event_recovery (
    int EE,                    // EE code
    HSCTime LoadTime,          // Load time for the EE
    int8 SeqID)                // Sequence ID for recovery
//-----------------------------------------------------------
// HSC_GDA_CONTROL_RECIPE_COMPLETE - signals that all
// recipe events for the CR are journaled
//-----------------------------------------------------------
void hsc_gda_control_recipe_complete (
    int4 BatchID) // Batch ID
```

The event SDC 216 may also support various functions to enable guaranteed event delivery in the process control system. To keep track of any lost recipe events, the event SDC 216 may need to maintain an in-memory list containing the available "recipe event-capable" execution environments, the last sequence identifier received from each of these execution environments, and their load times. This list may provide fast lookup of the sequence identifier that the event SDC 216 is expecting from an execution environment. An example of the internal list in the event SDC 216 is shown in Table 4.

TABLE 4

| EE code | EE load time | Last received sequence ID |
|---------|--------------|---------------------------|
| 1 | 14, Dec. 2004 11:53:39.463 | 979574 |
| 14 | 24, Jan. 2005 19:35:23:535 | 0 |
| 16 | 03, Nov. 2004 06:12:48:032 | 35332623 |
| . | . | . |
| . | . | . |
| . | . | . |

Note that the second record in the list above has a last received sequence identifier of zero. This means that the event SDC 216 has not journaled any recipe events from this execution environment before, or the execution environment has reloaded and the event SDC 216 is expecting the CDA server 204 to recover all recipe events from the execution environment. The list may be initialized when the server starts.

To keep track of all journaled recipe events from each "recipe event-capable" execution environment, a table may be used in an SQL or other database. The table may contain all execution environments that previously have had their recipe events journaled, the last sequence identifier journaled from each of these execution environments, and their execution environment load times. The layout of the table may be the same as the list above. After a time period elapses (such as every minute), the event SDC 216 may copy all entries in its in-memory list to this table. This may reduce or minimize the load placed on the event SDC 216 to update the table. In terms of redundancy, this table may be synchronized to a backup server in the same manner as the event journal 218.

A getSequenceIDs( ) function of the event SDC 216 may be called by the notification client 206 when the CDA server 204 tries to initiate a recipe event recovery. It may return the sequence identifiers of the last-journaled recipe events received from a requested list of execution environments. When this function is called, the event SDC 216 may try to resolve this request using its internal list first. If an execution environment entry is found with the same requested execution environment load time, the event SDC 216 may return the last received sequence identifier from the list. If the execution environment load time is different, this may mean the controller has been reloaded, and the function may return a zero sequence identifier for the call to indicate that the event SDC 216 wants to recover all recipe events from the execution environment. For the latter case, the execution environment entry in the event SDC's internal list may be updated with the new load time for the execution environment and a zero sequence identifier. If the execution environment entry cannot be found in the list or the list has not been initialized, the event SDC 216 may make a query to the event journal 218 to obtain the largest sequence identifier journaled for the execution environment with the same requested execution environment load time. This value is then used in the appropriate entry in the event SDC's internal list. The query to the event journal 218 may be made using an ems_sp_GetGetSequenceID stored procedure. If the sequence identifier is found, the function may update the event SDC's internal list and return with that sequence identifier. Otherwise, a sequence identifier of zero may be returned. Below are more details about the getSequenceIDs( ) function and the stored procedure.

```
// DESCRIPTION:
// Get the latest sequence ID for each of the EEs in the list
// PARAMETERS:
//     [in] short connectID,
//     [in] int NumOfEE,
//     [in] int* EEs,
//     [in]___int64* EELoadTimes,
// RETURN VALUES:
//     Standard com S_OK or E_FAIL.
//     [out] ___int64** EESequenceIDs
[helpstring("Event SDC method getSequenceIDs")] HRESULT
getSequenceIDs (
        [in] short connectID,
        [in] int NumOfEE,
        [in] int* EEs,
        [in]___int64* EELoadTimes,
        [out]___int64** EESequenceIDs);
ems_sp_GetGetSequenceID.sql
// NAME: ems_sp_GetGetSequenceID
// DESCRIPTION:
// Retrieves the latest sequence ID for the EE given its
// load time
// PARAMETERS:
// @EE          (in)    The EE to get the latest sequence ID for
// @LoadTime    (in)    The load time of the EE
// @SequenceID  (out)   The retrieved latest sequence ID
```

When the event SDC 216 processes recipe events, it may check for any gap in the sequence identifiers. If it detects a recipe event with a sequence identifier higher than the next expected sequence identifier, this may mean one or more events have been lost, and the event SDC 216 may command a recipe event recovery immediately. If the event SDC 216 receives the expected recipe event for the execution environment, the event SDC 216 may update its internal list with the sequence identifier of the event. If the event SDC 216 detects a recipe event with a sequence identifier lower than the last received sequence identifier in the list, it may do nothing to the list. In all three cases, the event SDC 216 may journal the recipe events into the event journal 218.

When the event SDC 216 receives a recipe event recovery begin bracket, it may update its internal list with the sequence identifier stored in the event's value field if and only if the sequence identifier in the list is less than the received sequence identifier. This is because the sequence identifier in the list identifies the last recipe event journaled, and there may be no need to revert the sequence identifier to anything lower than that. The event SDC 216 may never receive a recovery begin bracket that has a different execution environment load time than contained in its internal list. This is because, whether the event SDC 216 commands or the CDA server 204 activates a recipe event recovery, the event SDC 216 may always update its internal list with the new execution environment load time first. When the recovery begin bracket reaches the event SDC 216, it may always contain the expected execution environment load time.

To support guaranteed event delivery, the following attributes may be added to event schema supported by the event journal 218: a batch identifier, a sequence identifier, and an execution environment load time. All of these attributes may be journaled into the event journal 218. Also, an additional parameter index attribute (such as a UINT32 value) may be added to the event schema, and the CDA notification field may be mapped to this attribute. This attribute in the event schema may also be journaled into the event journal 218.

As noted above, the CDA server 204 could use a notification structure that includes a sub-condition field, which could represent a string (such as LPSTR). This new notification field may be mapped into the existing sub-condition attribute in the event schema.

The following represents specific scenarios that might occur in the process control system 100. A control recipe may start and generate recipe events that are journaled in the event journal 218. The controller, which is still running the control recipe, is then powered off (assuming no battery backup and an empty database. A complete reload of the controller is performed, and the control recipe is started again. All new recipe events from the execution environment need to be retrieved. Without the load time of the execution environment, the event SDC 216 may not know that the controller has been reloaded, and it may request an event recovery using the sequence identifier continued from the last recipe event received from the execution environment prior to the reload. This may cause some new recipe events generated from the new run of the control recipe to be missed during the recovery. To avoid this, the control execution environment could continue using the next sequence identifier even after a load, the batch identifier could be used instead of the load time, or the next sequence identifier could be persisted even after a reload of the controller. Also, the CDA server 204 may only have the list of execution environments and not their load times, and the event SDC 216 could return the sequence identifier associated with the latest load time for an execution environment. The CDA server 204 could also provide this load time to the event SDC 216 since the load time in the event SDC 216 may not be the execution environment's current load time and the event SDC 216 may need to know the current load time to identify the sequence identifier at which to start recovery. The CDA server 204 could obtain the load time from the execution environment.

In another example scenario, there could be situations where a control recipe has completed its execution and the control recipe complete event is sent but is lost before it reaches the event SDC 216. As a result, the CDA server 204 may be stuck waiting for a signal from the event SDC 216 before the control recipe can be deleted. There could be a mechanism to recover from this state, such as having the CDA server 204 re-announce this event after some timeout.

In addition, the CDA server 204 may not hold on to any events (except in the case of console stations through a notification cache). As a result, there may be no way of even the CDA server 204 knowing that an event has been lost on its way to the notification client 206. The CDA server 204 could be enhanced so that every time it sends a recipe complete event to the notification client 206, it waits to get the hsc_g-da_control_recipe_complete() call from the event SDC 216 within a specified time period (after which the CDA server 204 re-announces this event). Also, if a control execution environment does not receive the recipe complete indication from the event SDC 216 (through the CDA server 204), it may reissue the recipe complete event.

Although FIGS. 5 and 6 illustrate one specific example of a portion of a process control system supporting guaranteed batch event delivery, various changes may be made to FIGS. 5 and 6. For example, the process control system 500 could include any number of each of the components 502-518. Also, other suitable techniques could be used to implement or support guaranteed event delivery.

Figure 7:
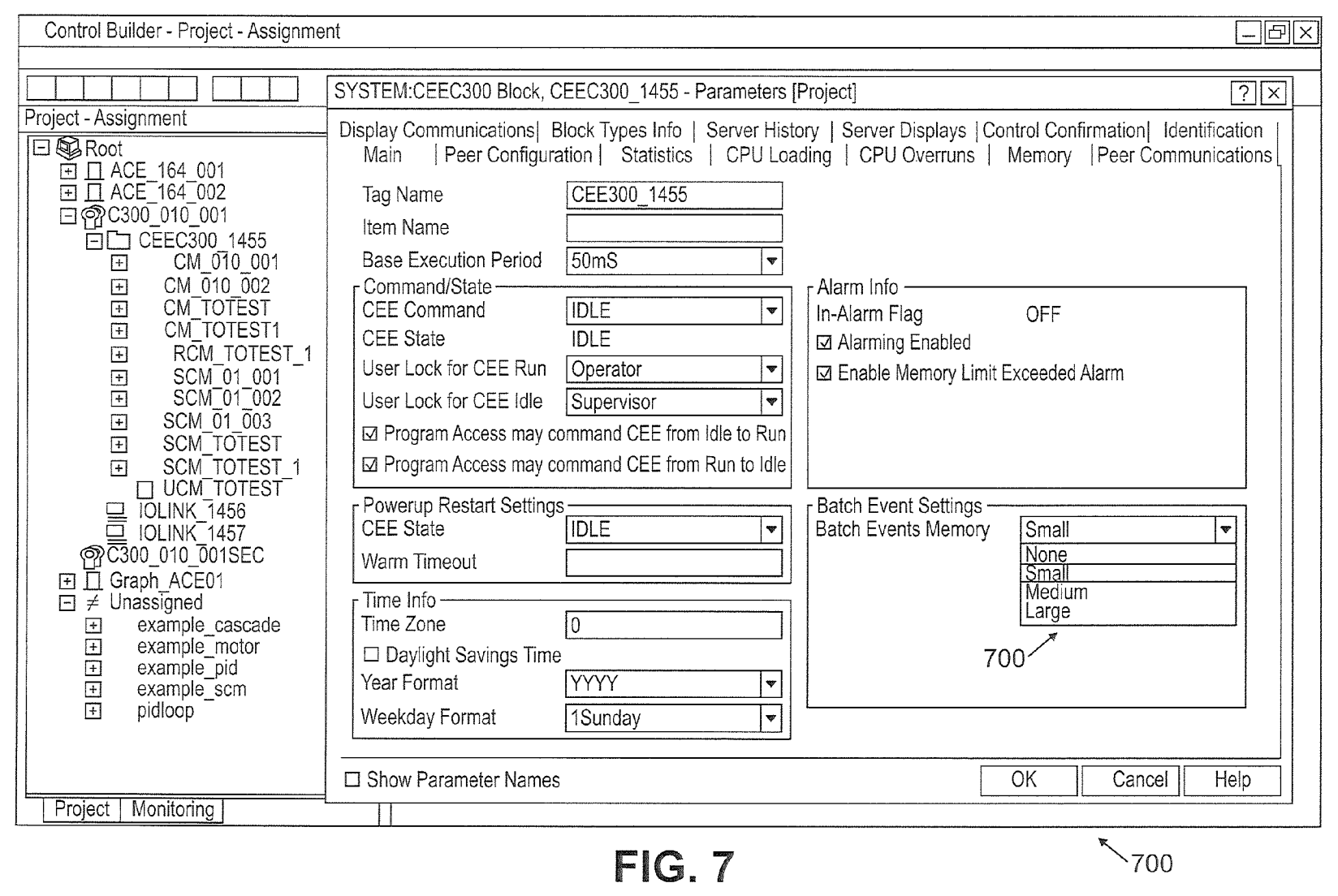

FIG. 7 illustrates an example user interface 700 supporting guaranteed batch event delivery in a process control system. The embodiment of the user interface 700 shown in FIG. 7 is for illustration only. Other embodiments of the user interface 700 may be used without departing from the scope of this disclosure.

In this example, the user interface 700 is associated with a control execution environment. The user interface 700 includes various tabs for accessing different information about and setting different operational aspects of the control execution environment. When the "main" tab is selected, the user interface 700 presents various information and selections to the user. One of the selections includes a drop-down menu 702, which can be used by the user to select the size of the event buffer 203 in the control execution environment. In this example, the drop-down menu 702 includes four different options for the buffer size: none, small, medium, and large. With the "none" option, a buffer size of zero is used, and guaranteed batch event delivery is disabled. In particular embodiments, the small, medium, and large buffers 203 can accommodate 120, 240, and 740 events, respectively. The user selects a proper buffer size based on, for example, the application in which the control execution environment is being used.

Although FIG. 7 illustrates one example of a user interface 700 supporting guaranteed batch event delivery in a process control system, various changes may be made to FIG. 7. For example, any other suitable user interface or other suitable technique could be used to set the size of the event buffer 203 in a control execution environment.

Figure 8:
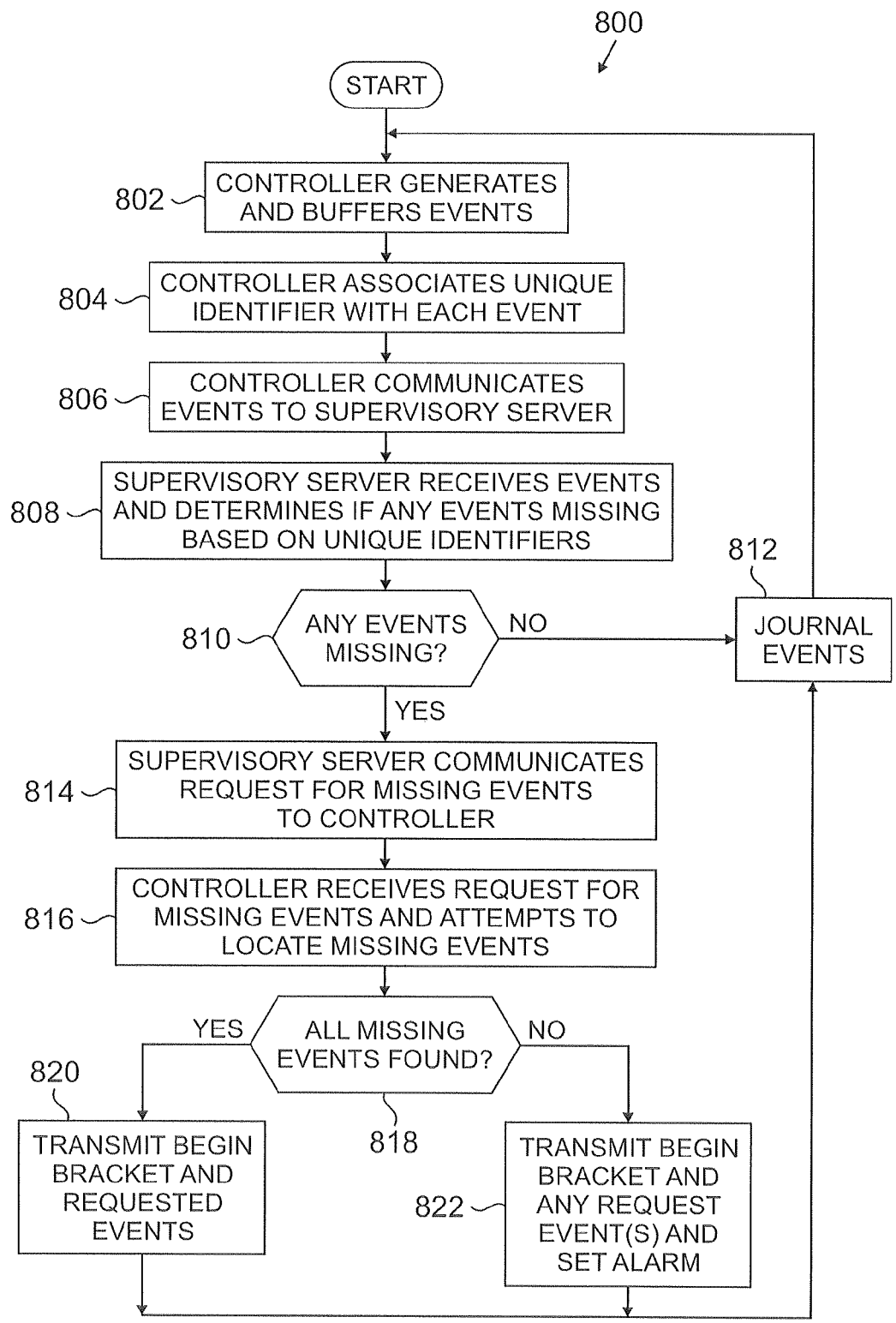
FIG. 8 illustrates an example method for guaranteed batch event delivery in a process control system.

FIG. 8 illustrates an example method 800 for guaranteed batch event delivery in a process control system. The embodiment of the method 800 shown in FIG. 8 is for illustration only. Other embodiments of the method 800 could be used without departing from the scope of this disclosure.

A controller generates and buffers multiple events at step 802. This may include, for example, a control execution environment generating various events associated with its operation, such as events associated with the execution of one or more recipe control modules 504 and sequential control modules 506.

The controller associates a unique identifier with each event at step 804. This may include, for example, the controller assigning sequential numerical values to a sequence of events generated by the controller. The sequence number for each event could be unique within the current execution of the control execution environment. The sequence number, a code identifying the control execution environment, and the control execution environment's load time may collectively represent an identifier that uniquely identifies an event in the entire process control system.

The controller communicates the events to a supervisory server at step 806, and the supervisory server receives at least some of the events and determines if any events are missing at step 808. This could include, for example, the control execution environment providing the events to the notification client 206 for storage in the notification queue 208. This could also include the notification manager 210 retrieving the events from the notification queue 208. This could further include the notification manager 210 storing the events in the event list 214. In addition, this could include the event SDC 216 determining if any events are missing using the unique identifiers of the received events.

If no events are missing at step 810, the events are journaled at step 812. This could include, for example, the event SDC 216 storing the events in the journal 218. At this point, the process returns to step 802 where the controller generates more events. Otherwise, one or more events are missing, and the supervisory server communicates a request for the missing events to the controller at step 814. This may include, for example, the supervisory server sending a request for an event recovery. The request could be sent to the CDA server 204 through the notification client 206 or the GDA manager 220.

The controller receives the recovery request and attempts to locate the missing events at step 816. This may include, for example, the CDA server 204 causing the control execution environment to examine the events in its buffer 203, looking for events to be retransmitted. If all missing events are found at step 818, the controller transmits a begin bracket and the requested events, including the missing events, at step 820. Otherwise, one or more missing events cannot be found, such as when one or more events have been overwritten in the event buffer 203. In that case, the controller transmits a begin bracket and any requested events that could be found (if any) and sets an alarm at step 822. If none of the missing events could be found in the buffer 203, the transmission of the begin bracket and the requested events could be omitted in step 820. The alarm set in step 822 could, for example, inform a user of the missing events, allowing the user to take any suitable action. The recovered events are journaled at step 812, and the process returns to step 802 where the controller generates more events.

Although FIG. 8 illustrates one example of a method 800 for guaranteed batch event delivery in a process control system, various changes may be made to FIG. 8. For example, while shown as a series of steps, various steps in FIG. 8 could overlap, occur in parallel, or occur in a different order. As a particular example, the controller could continuously generate, buffer, and communicate events to the supervisory server, and the controller could intermittently retransmit lost or missing events to the supervisory server as needed.

In some embodiments, various functions are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
generating multiple events associated with execution of a recipe control module by a controller in an industrial process control system that is associated with production or processing of a product, the recipe control module defining production or processing requirements for a batch of the product and having a set of phases, each phase associated with a sequential control module, each sequential control module configured to implement the associated phase of the recipe control module, each event associated with a unique identifier;
storing the events in a buffer of a memory in the controller;
communicating the events from the buffer to a control data access server for delivery to a supervisory device associated with the controller, the control data access server configured to provide secure data access to and from a control execution environment of the controller;
delivering, by the control data access server, the events to a notification client for storage in a notification queue;
retrieving, by a notification manager, the events from the notification queue and storing the events in an event list;
determining, by an event system data component, if one or more events are missing using the unique identifiers associated with the events from the event list;
receiving, by the controller, a request from the control data access server to recover one or more of the events for the supervisory device in response to determining that at least one event is missing;
recovering at least one of the events from the buffer;
communicating the at least one recovered event to the control data access server for delivery to the supervisory device; and
preventing deletion of the recipe control module until all events generated by the recipe control module have been journaled by the supervisory device.

2. The method of claim 1, wherein the request identifies the unique identifier associated with one of the events.

3. The method of claim 2, wherein:
the unique identifier identified in the request comprises a numerical identifier; and
recovering the at least one event from the buffer comprises recovering an event associated with a numerical identifier that is greater than the numerical identifier identified in the request.

4. The method of claim 1, further comprising:
generating an alarm in response to recovering less than all desired events from the buffer.

5. The method of claim 1, further comprising:
creating the buffer, the buffer having a user-specified size.

6. An apparatus comprising:
at least one memory configured to store a unique identifier associated with a first event received from a controller, the first event associated with execution of a recipe control module by the controller in an industrial process control system that is associated with production or processing of a product, the recipe control module defining at least one production or processing requirement for a batch of the product and having a set of phases, each phase associated with a sequential control module, each sequential control module configured to implement the associated phase of the recipe control module; and
at least one processor configured to:
receive a second event from the controller through a control data access server, the control data access server configured to provide secure data access to and from a control execution environment of the controller;
determine whether any events between the first event and the second event have not been received from the controller using the unique identifier;
initiate an event recovery if at least one event between the first event and the second event has not been received from the controller; and
communicate a request for the event recovery to the controller through the control data access server;
wherein the control data access server is configured to deliver the events to a notification client for storage in a notification queue, and a notification manager is configured to retrieve the events from the notification queue and to store the events in an event list;
wherein an event system data component is configured to determine if any of the events are missing using unique identifiers associated with the events from the event list;
wherein the controller is configured to recover at least one event from a buffer of the controller in which the events are stored in response to the request and to communicate the at least one recovered event to the control data access server for delivery to the supervisory device; and
wherein the controller is configured to prevent deletion of the recipe control module until all events generated by the recipe control module have been journaled.

7. The apparatus of claim 6, wherein:
the unique identifier associated with the first event comprises a first numerical identifier;
the first event comprises a most recently received event from the controller; and
the at least one processor is configured to determine whether any events between the first event and the second event have not been received from the controller by determining if a second numerical identifier associated with the second event is one greater than the first numerical identifier.

8. The apparatus of claim 6, wherein the at least one processor is further configured to receive at least one recovered event from the controller during the event recovery.

9. The apparatus of claim 8, wherein:
the unique identifier associated with the first event comprises a first numerical identifier;
the at least one processor is configured to initiate the event recovery by identifying the first numerical identifier; and
each recovered event is associated with a numerical identifier that is greater than the first numerical identifier.

10. The apparatus of claim 6, wherein the apparatus comprises a supervisory device associated with the controller in the process control system, the supervisory device configured to journal the events in a database.

11. The apparatus of claim 6, wherein the at least one processor is configured to provide the controller with a signal indicating that all the events generated by the recipe control module have been received from the controller, the controller configured to prevent deletion of the recipe control module until the signal has been received.

12. A non-transitory computer readable medium embodying a computer program, the computer program comprising:
computer readable program code for generating multiple events associated with execution of a recipe control module by a controller in an industrial process control system that is associated with production or processing of a product, the recipe control module defining production or processing requirements for a batch of the product and having a set of phases, each phase associated with a sequential control module, each sequential control module configured to implement the associated phase of the recipe control module, each event associated with a unique identifier;
computer readable program code for storing the events in a buffer of a memory in the controller;
computer readable program code for communicating the events from the buffer to a control data access server for delivery to a supervisory device associated with the controller, the control data access server configured to provide secure data access to and from a control execution environment of the controller;
computer readable program code for delivering, by the control data access server, the events to a notification client for storage in a notification queue;
computer readable program code for retrieving, by a notification manager, the events from the notification queue and storing the events in an event list;
computer readable program code for determining, by an event system data component, if one or more events are missing using the unique identifiers associated with the events from the event list;
computer readable program code for receiving, by the controller, a request from the control data access server to recover one or more of the events for the supervisory device in response to determining that at least one event is missing;
computer readable program code for recovering at least one of the events from the buffer;
computer readable program code for communicating the at least one recovered event to the control data access server for delivery to the supervisory device; and
computer readable program code for preventing deletion of the recipe control module until all events generated by the recipe control module have been journaled by the supervisory device.

13. The computer readable medium of claim 12, wherein the request identifies the unique identifier associated with one of the events.

14. The computer readable medium of claim 13, wherein:
the unique identifier identified in the request comprises a numerical identifier; and
the computer readable program code for recovering the at least one event from the buffer comprises computer readable program code for recovering an event associated with a numerical identifier that is greater than the numerical identifier identified in the request.

15. The computer readable medium of claim 12, further comprising:
computer readable program code for generating an alarm in response to recovering less than all desired events from the buffer.

16. The computer readable medium of claim 12, further comprising:
computer readable program code for creating the buffer, the buffer having a user-specified size.

17. A system comprising:
a controller configured to control one or more process elements in an industrial process control system that is associated with production or processing of a product, the controller also configured to generate and store in a buffer multiple events associated with execution of a recipe control module by the controller, each event associated with a unique identifier, the recipe control module defining production or processing requirements for a batch of the product and having a set of phases, each phase associated with a sequential control module, each sequential control module configured to implement the associated phase of the recipe control module;
a control data access server, the controller further configured to communicate the events from the buffer to the control data access server, the control data access server configured to provide secure data access to and from a control execution environment of the controller;
a notification client configured to receive the events from the control data access server and to store the events in a notification queue;
a notification manager configured to retrieve the events from the notification queue and to store the events in an event list;
an event system data component configured to determine if any events are missing using the unique identifiers associated with the events from the event list; and
a supervisory device configured to receive at least some of the events from the controller via the control data access server, the supervisory device also configured to initiate an event recovery by the controller and to communicate an event recovery request to the controller through the control data access server if at least one of the events from the controller is missing;
wherein the controller is further configured to recover at least one event and to communicate the at least one recovered event to the control data access server for delivery to the supervisory device during the event recovery; and
wherein the controller is configured to prevent deletion of the recipe control module until all events generated by the recipe control module have been journaled by the supervisory device.

18. The system of claim 17, wherein:
the unique identifiers comprise numerical identifiers; and
the supervisory device is configured to determine whether any of the events have not been received from the controller by determining if a gap exists in the numerical identifiers associated with the events received from the controller.

19. The system of claim 18, wherein:
the supervisory device is configured to initiate the event recovery by identifying the numerical identifier associated with one of the events; and
the controller is configured to recover any event having a numerical identifier greater than the numerical identifier identified by the supervisory device.

20. The system of claim 17, wherein the controller is further configured to generate an alarm in response to recovering less than all desired events.

21. The system of claim 17, further comprising:
a batch event processor configured to process additional events and insert the additional events into the event list, bypassing the notification manager.

* * * * *